United States Patent

Yokota et al.

[11] Patent Number: 6,118,484
[45] Date of Patent: *Sep. 12, 2000

[54] IMAGING APPARATUS

[75] Inventors: Hideo Yokota; Masamichi Toyama; Toshiki Ishino, all of Yokohama, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/442,558

[22] Filed: May 16, 1995

Related U.S. Application Data

[63] Continuation of application No. 08/064,666, May 21, 1993, abandoned.

[30] Foreign Application Priority Data

| May 22, 1992 | [JP] | Japan | 4-154162 |
| May 22, 1992 | [JP] | Japan | 4-154165 |
| May 22, 1992 | [JP] | Japan | 4-154169 |
| Jun. 30, 1992 | [JP] | Japan | 4-194532 |

[51] Int. Cl.[7] .......................... H04N 5/222; H04N 5/225; H04N 5/232
[52] U.S. Cl. .......................... 348/350; 348/170; 348/222; 348/347; 396/51
[58] Field of Search ................. 348/169, 170, 348/352, 208, 345, 346, 7, 349–351; 354/400, 402, 430; 364/516; 396/51, 84, 88, 96, 121, 123, 124, 153; H04N 5/232, 5/222, 5/225

[56] References Cited

U.S. PATENT DOCUMENTS

| 4,272,783 | 6/1981 | Warnstam et al. | 348/170 |
| 4,912,500 | 3/1990 | Yokota et al. | 354/479 |
| 5,012,270 | 4/1991 | Sekine et al. | 396/54 |
| 5,031,049 | 7/1991 | Toyoma et al. | 348/352 |
| 5,173,865 | 12/1992 | Koike et al. | 348/699 |
| 5,245,371 | 9/1993 | Nagano et al. | 396/51 |
| 5,253,008 | 10/1993 | Konishi et al. | 396/51 |
| 5,335,035 | 8/1994 | Maeda | 396/51 |
| 5,594,500 | 1/1997 | Tanaka et al. | 348/345 |

FOREIGN PATENT DOCUMENTS

| 63-217880 | 9/1988 | Japan | H04N 5/232 |
| 1190177 | 7/1989 | Japan | H04N 5/232 |
| 2-32312 | 2/1990 | Japan | G02B 7/11 |
| 2117276 | 5/1990 | Japan . | |
| 3154576 | 7/1991 | Japan | H04N 5/232 |

*Primary Examiner*—Wendy Garber
*Assistant Examiner*—Ngoc-Yen Vu
*Attorney, Agent, or Firm*—Fitzpatrick, Cella, Harper & Scinto

[57] ABSTRACT

An imaging apparatus includes a sight axis detecting unit for detecting a sight axis of an observer, a driving unit for driving an objective lens system on the basis of an area detected by the sight axis detection unit, a display unit for displaying areas of a plurality of objects on the basis of an image signal of an image pick-up unit, an image pick-up unit, and an objective lens system.

9 Claims, 31 Drawing Sheets

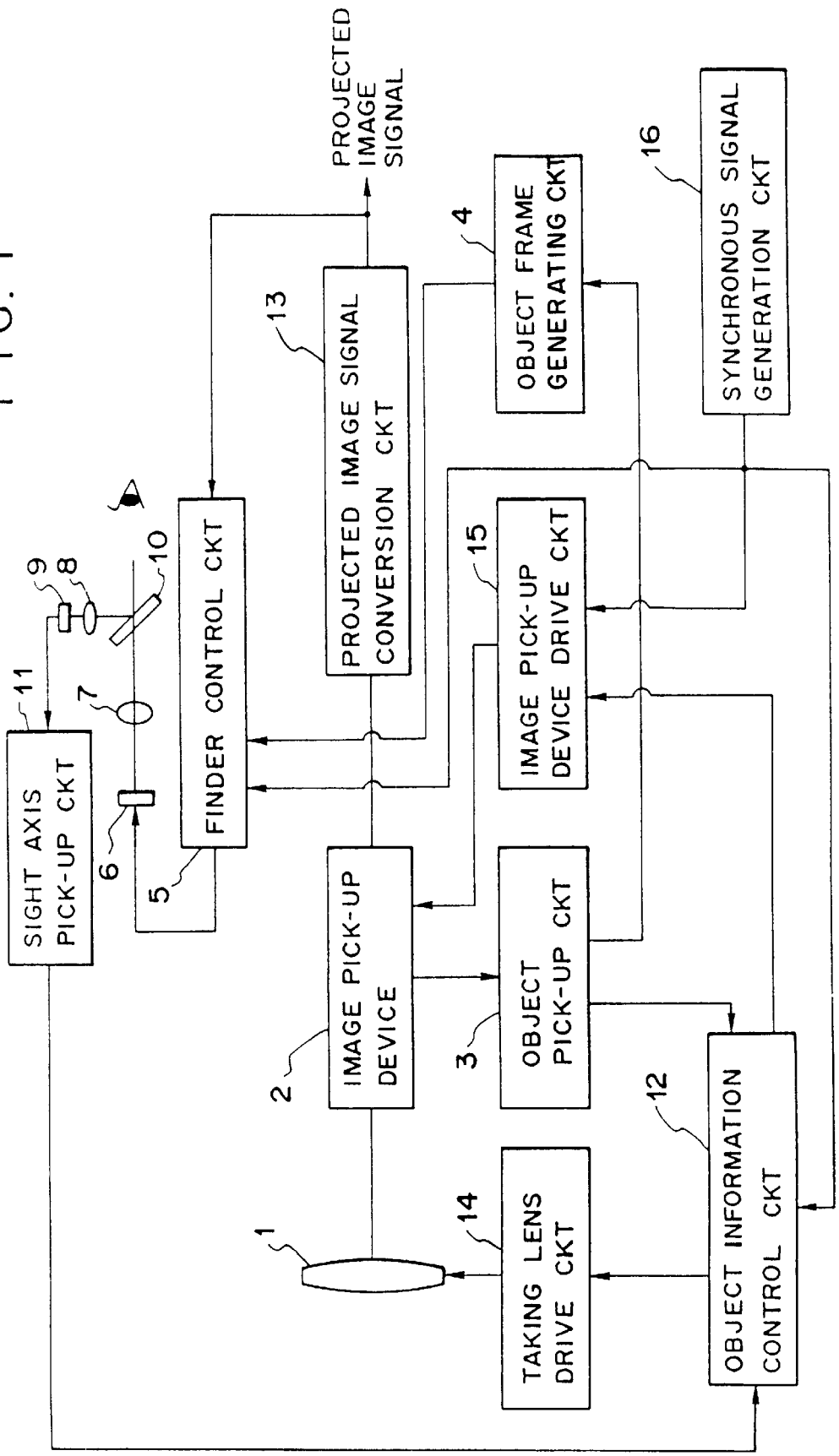

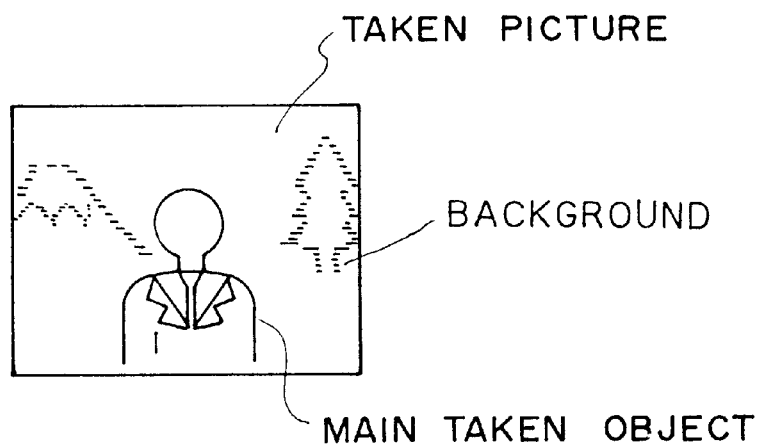
FIG. 2A — TAKEN PICTURE, BACKGROUND, MAIN TAKEN OBJECT
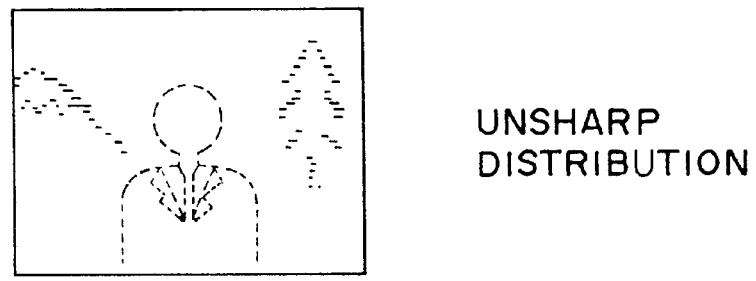
FIG. 2B — UNSHARP DISTRIBUTION
FIG. 2C — PICKING-UP OBJECT

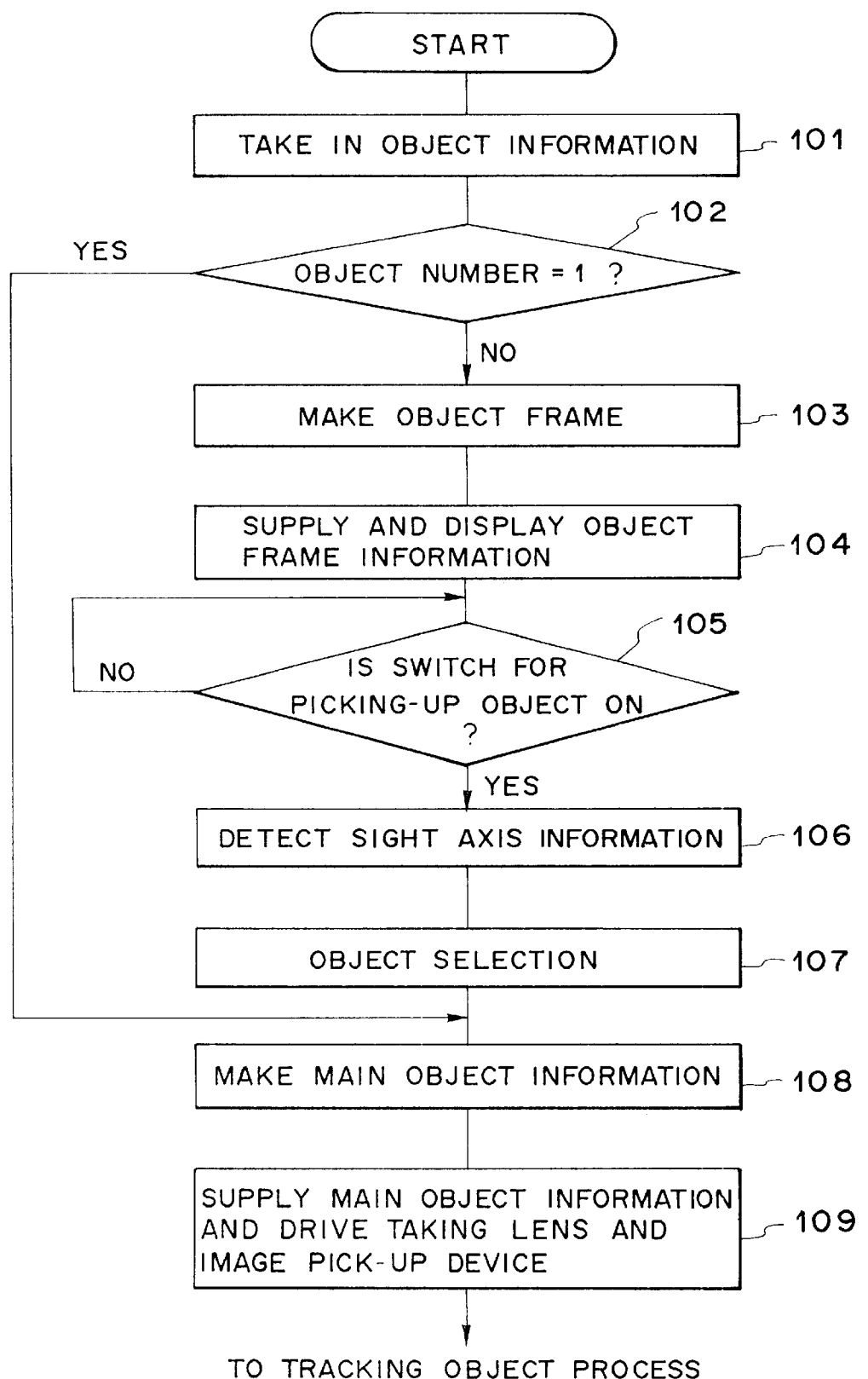

BACKGROUND
OBJECT

TARGET OBJECT (OBJECT SELECTION)

(MOVEMENT)

TRACKING (FOCUS DRIVE) (OBJECT FRAME PICK-UP)
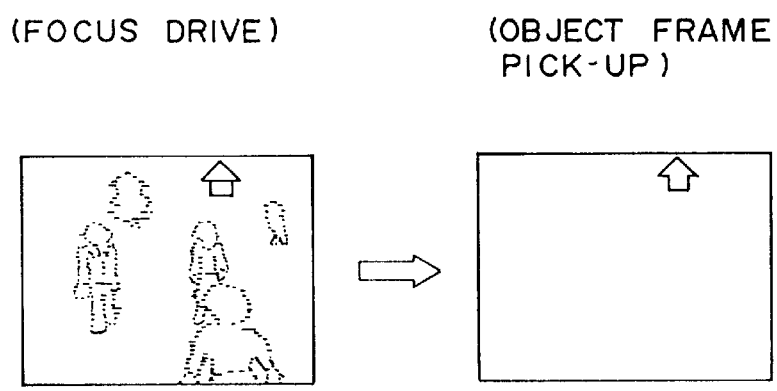
FIG. 9A
FIG. 9B
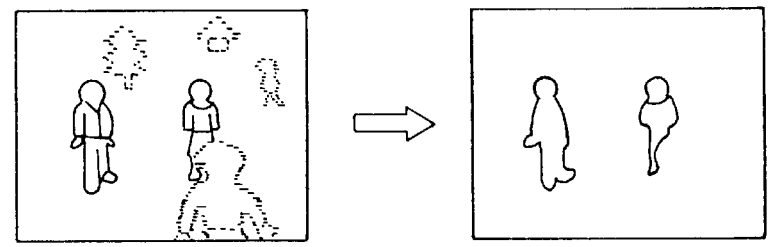
FIG. 9C
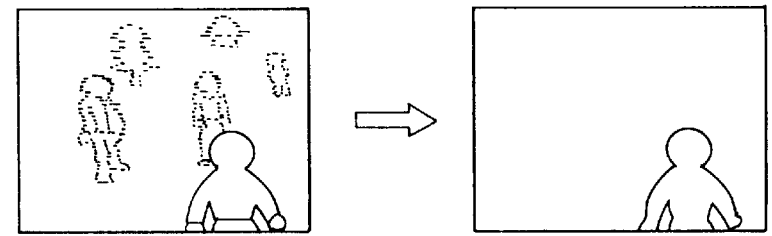
FIG. 9D (SYNTHESIZED OBJECT FRAME)

(SELECTION)

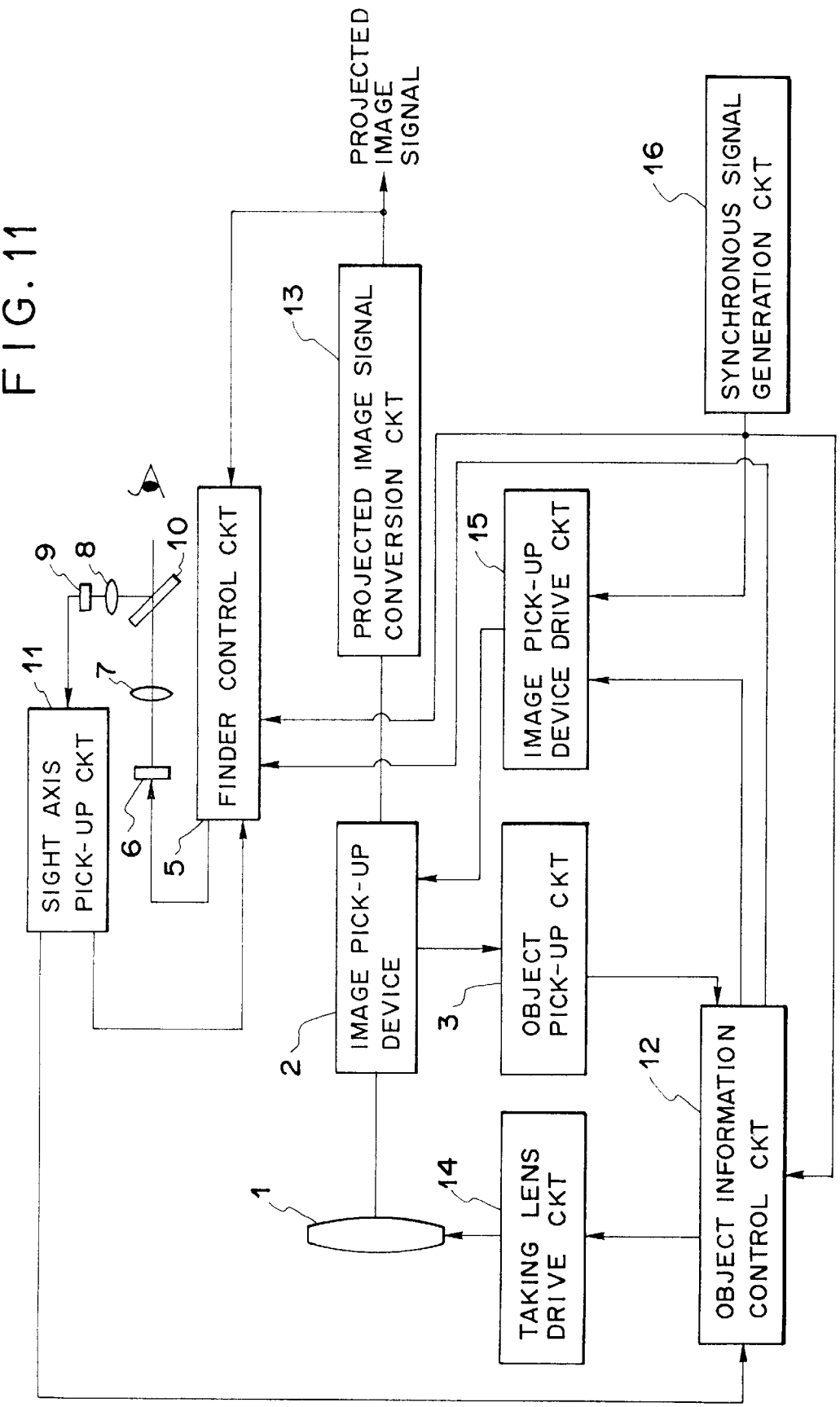

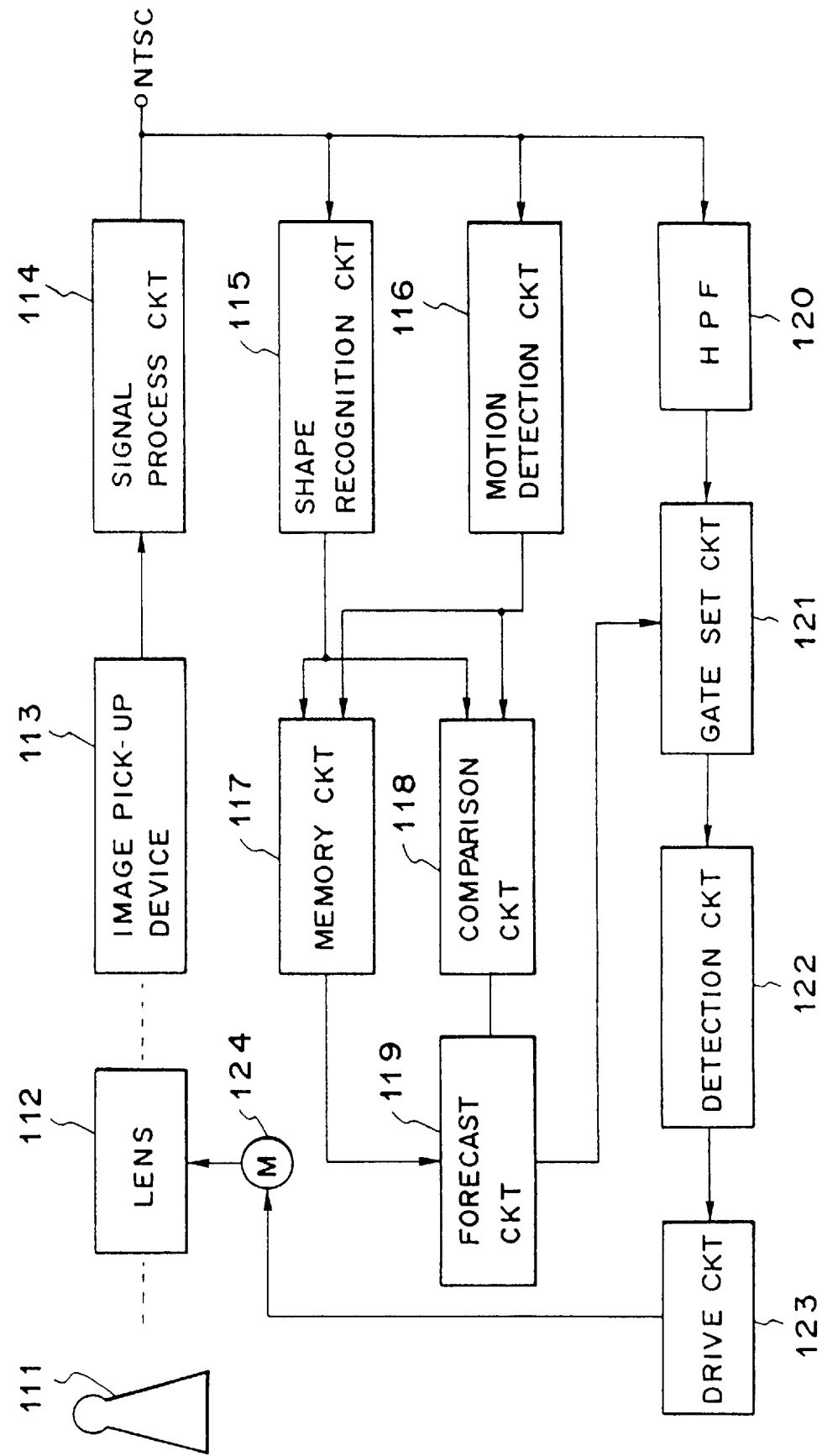

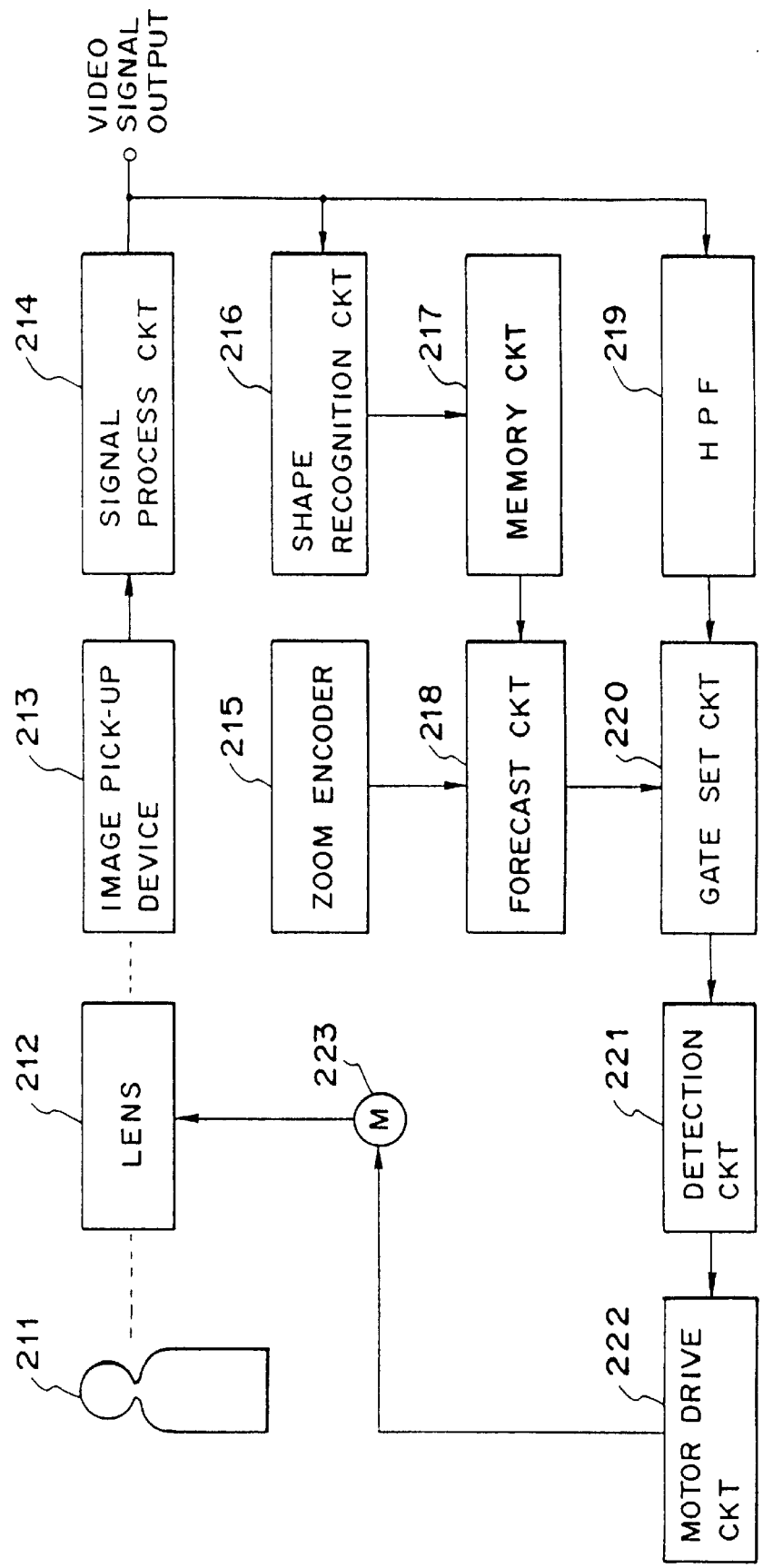

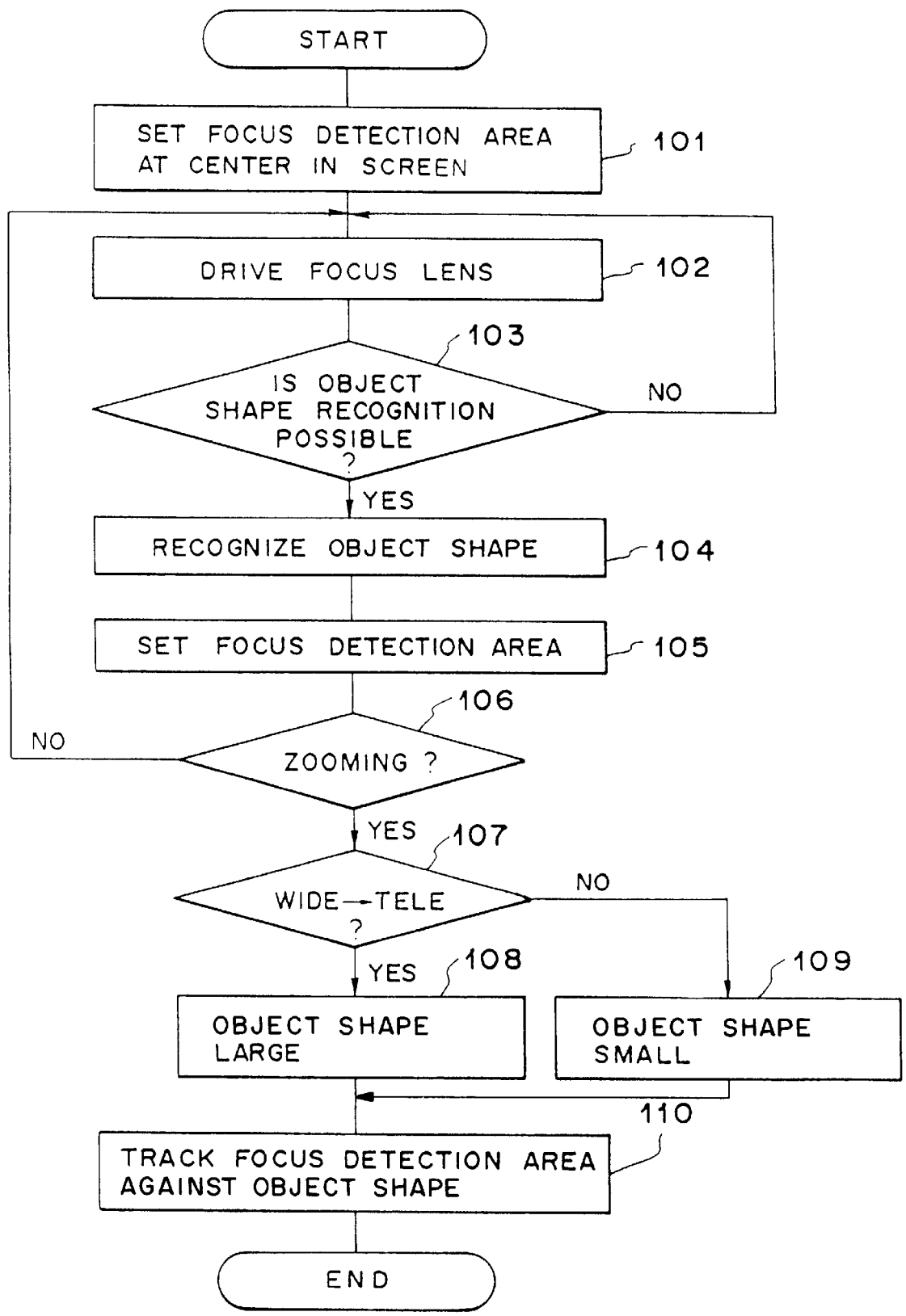

UNSHARP DISTRIBUTION

PICKING UP OBJECT

FIG. 27
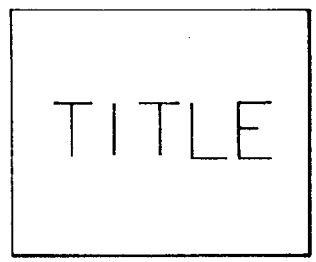
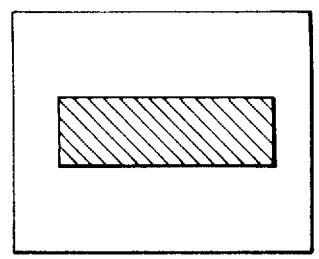
FIG. 28A
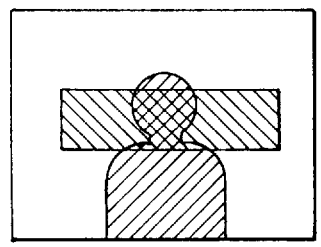
FIG. 28B
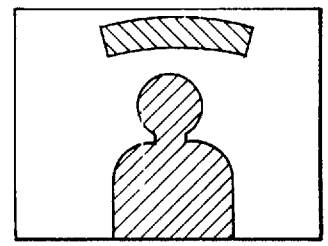
FIG. 28C
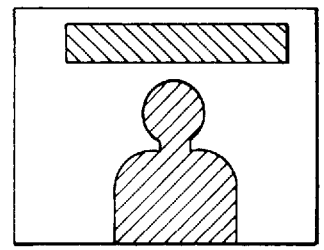
FIG. 28D
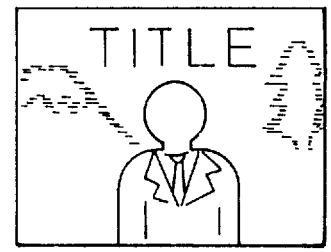

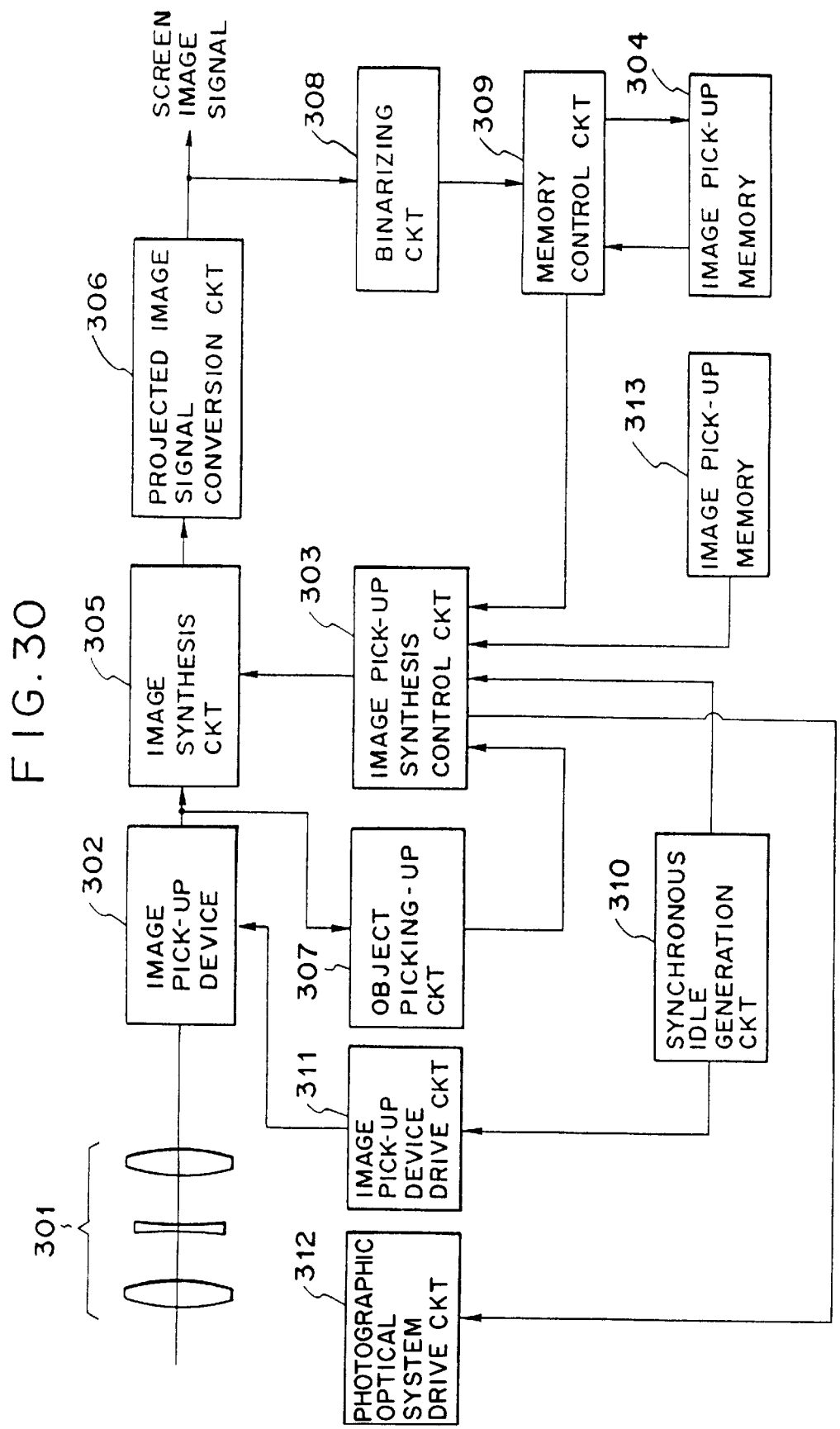

(COMPARISON)

(OPTICAL CHANGING
         MAGNIFICATION)

(SYNTHESIS)

IMAGING APPARATUS

This application is a continuation of application Ser. No. 08/064,666 filed May 21, 1993, abandoned.

BACKGROUND OF THE INVENTION

1. Field of the Invention

The present invention relates generally to an imaging apparatus having an image pick-up device, such as CCD. The present invention relates particularly to an imaging apparatus which is designed to recognize an object so as to allow a taking lens to be kept focused on the object.

2. Description of the Related Art

An imaging apparatus in which focusing of a taking lens focused on an object is maintained even when the object is in motion is disclosed in, for example, U.S. Pat. No. 5,031, 049. In that imaging apparatus, the movement of the object is detected on the basis of an electrical signal in a tracking area. The tracking area is moved in response to the movement of the object, and focusing of the taking lens is detected on the basis of part of the electrical signal in that tracking area.

However, in this conventional imaging apparatus, the area to be set for control of the shooting operation is preset on a screen, and thus cannot be set at a desired position by the photographer, thus limiting the shooting range. Therefore, in an apparatus in which an object area (range) is set on the basis of the information on the object, such as focusing information, since the object area is set depending on a focused or non-focused condition thereof, an object which is not intended by the photographer may be selected, i.e., focusing may be conducted on an undesired object.

Automatic focusing devices for video cameras are known, which detect the end definition of a shot screen by the high frequency component of a video signal to control focusing such that the high frequency component is at a maximum. This automatic focusing system is based on the knowledge that the video signal rapidly changes at the edge of an object image, increasing the high frequency component level of the video signal, and that a higher frequency component level corresponds to a sharper object image.

The schematic configuration of such a conventional automatic focusing device is shown in FIG. 33.

In the figure, an object image is formed on a photo image device 502 by a lens 501. The photo image device 502 converts the object image into a video signal. Thereafter, a preamplifier (not shown) amplifies the video signal obtained by the photo image device 502, and outputs it to a signal processing circuit 503. The signal processing circuit 503 processes the signal to obtain a video signal conforming to, for example, NTSC method. A high-pass filter (HPF) 504 picks up the high frequency component from the output of the signal processing circuit 503, and outputs it to a gate setting circuit 505 which selectively passes only the signal of the area in which focusing is detected. A detection circuit 506 detects the output from the gate setting circuit 505 to form a signal indicating the maximum amplitude, i.e., the peak value, in the high frequency component points in the selected area. The output signal of the detection circuit 506 represents the degree of focusing of the lens 501. The higher the signal level, the higher the degree of focusing of the lens 501. A motor driving circuit 507 drives a motor 508 according to the output value of the detection circuit 506 which is produced for each screen to automatically focus the lens 501.

In the thus-arranged automatic focusing device, if both a distant object and a nearby object are present in the focus detection area, a focusing failure caused by a combination of distant and nearby objects may occur, making the lens focused on an undesired object or unstably focused. In order to eliminate such defects, Japanese Patent Application Laid-Open No. 3-154576 discloses the automatic focusing device which includes means for recognizing the shape of an object on which the lens is focused and in which the focus detection area is determined on the basis of the result of the recognition.

The above-described focusing failure caused by a combination of distant and nearby objects may be avoided by setting a focus detection area which is slightly larger than the recognized shape of the object. However, if changes in the shape or movement of the object are large or if the amount of camera shake is large, the focus detection area may deviate from the object, causing focusing failure caused by a combination of distant and nearby objects and hence unstable focusing, as in the case of the conventional device. In addition, where it takes time for the object shape recognition means to recognize the shape of the object, a time lag is increased, thus causing deviation of the focus detection area from the object.

In the above-described conventional automatic focusing device, if the photo taking lens is a zoom lens, a change in the size or position of the object on the screen by zooming impairs the focusing accuracy.

In a practical operation, when zooming is performed from the telephoto end to the wide-angle end, the size of the object on the screen decreases, allowing another object or background to enter the focus detection area. In that case, if such an object or background has a high contrast, it makes focusing unstable, thus reducing the focusing accuracy. Conversely, when zooming is conducted from the wide-angle end to the telephoto end, the object deviates from the focus detection area, making the luminance of the object have less contrast. This also makes automatic focusing unstable.

SUMMARY OF THE INVENTION

A primary object of the present invention is to provide an imaging apparatus which enables an object which is in motion to be tracked in order to stably keep a taking lens focused on the object.

A further object of the present invention is to provide an imaging apparatus which enables an object to be tracked to be intentionally selected using a device for detecting a sight axis of a photographer.

Another object of the present invention is to provide a tracking device which can alleviate a delay in response by providing a circuit for recognizing the shape of an object to be tracked on the basis of a projected image signal from an image pick up device and a circuit for forecasting a change in the shape or motion of the object from the output of the recognizing circuit.

BRIEF DESCRIPTION OF THE DRAWINGS

FIG. 1 is a block diagram of an embodiment of an imaging apparatus according to the present invention;

FIGS. 2A, 2B and 2C illustrate the operation of an object picking-up circuit of FIG. 1;

FIG. 4 is a flowchart showing the operation of the major portion of the imaging apparatus of FIG. 1;

FIGS. 9A, 9B, 9C and 9D illustrate the operation explained in FIG. 8;

FIG. 11 is a block diagram of still another embodiment of the imaging apparatus according to the present invention;

FIG. 14 is a block diagram of still another embodiment of an automatic focusing device according to the present invention;

FIG. 19 is a block diagram of an embodiment of a video camera according to the present invention;

FIG. 20 is a flowchart showing the operation of the portion of the video camera shown in FIG. 19 which is associated with the present invention;

FIG. 27 illustrates the operation explained in FIG. 26;

FIGS. 28A, 28B, 28C and 28D illustrate the operation explained in FIG. 27;

FIG. 30 is a block diagram of another embodiment of the imaging apparatus according to the present invention;

DETAILED DESCRIPTION OF THE PREFERRED EMBODIMENTS

Figure 3:
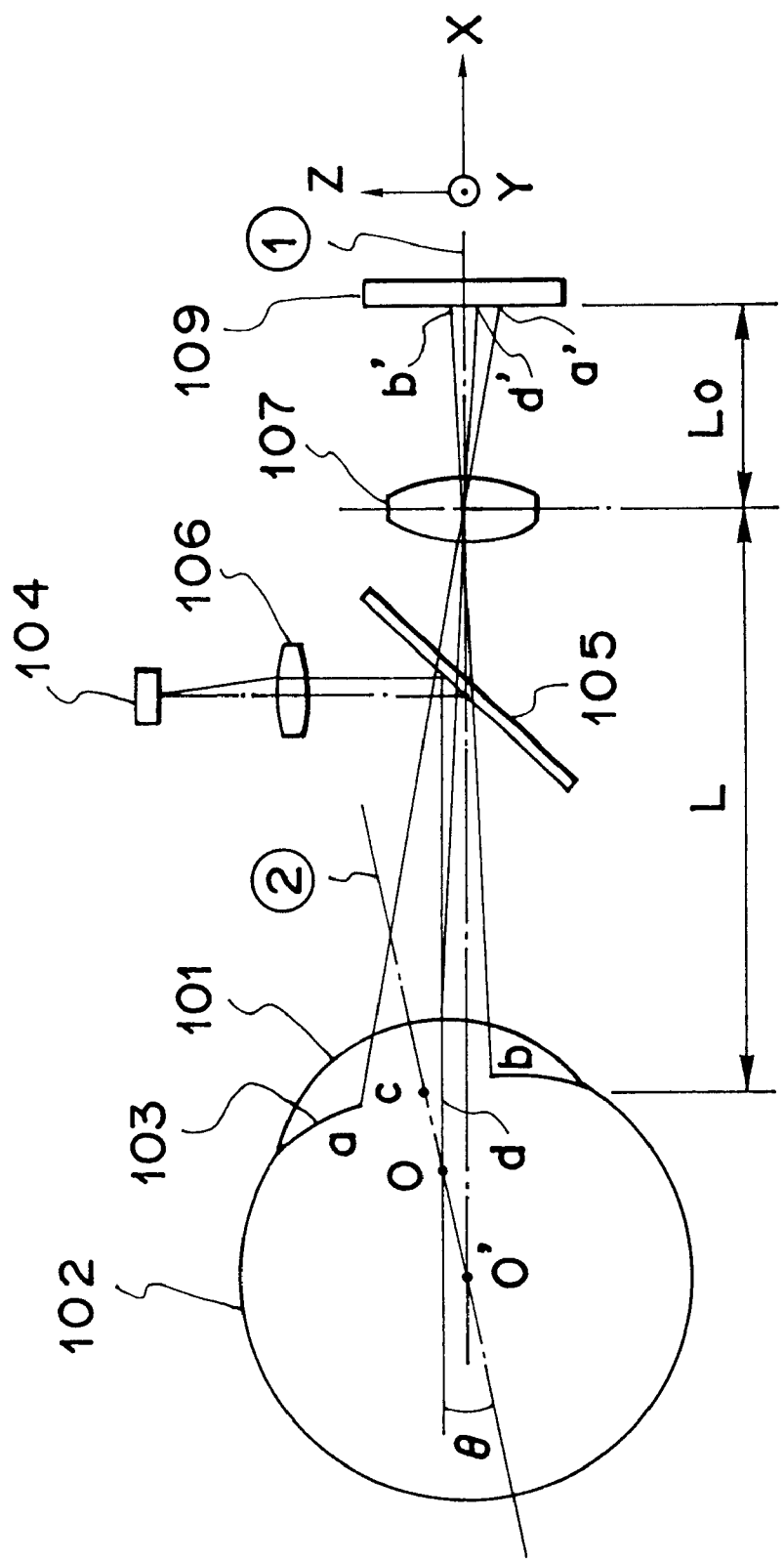
FIG. 3 illustrate the sight axis detection method carried out in a sight axis detection device of FIG. 1.

Embodiments of the present invention will be described below with reference to the accompanying drawings.

FIG. 1 is a block diagram of a first embodiment of an imaging apparatus according to the present invention. In the figure, a taking lens 1 may be a zoom lens having a plurality of movable lenses. An image pick up device 2 may be a CCD. An object pick up circuit 3 picks up (sets) the areas (ranges) of objects to be tracked by the camera in a taken picture from the image signal from the image pick up device 2. An object frame generating circuit 4 generates object frames on the basis of the area information picked up by the object pick up circuit 3. A finder control circuit 5 combines the object frames generated by the object frame generating circuit 3 with a projected image signal, and displays the obtained image on a liquid crystal display device 6. An eye piece 7 is for the photographer to observe the liquid crystal display device. A sight axis sensing optical system 8 senses the sight axis of the photographer from the movement of the eye-ball of the photographer. A detector 9 detects an image of the eye-ball. An optical path separating mirror 10 separates the optical path of a finder system from the optical path of the sight axis detection system. A sight axis pick up circuit 11 picks up the position of the sight axis of the photographer. The practically applied structure of the sight axis pick up circuit 11 is described in U.S. patent application Ser. No. 07/888,495. An object information control circuit 12 determines the major object on the basis of both the area information on a plurality of objects from the object pick up circuit 3 and the sight axis information from the sight axis pick up circuit 11 to control the object information. A projected image signal conversion circuit 13 converts the image signal from the image pick up device 2 into a projected image signal conforming to the television standard. A taking lens drive circuit 14 controls a focusing lens of the taking lens 1 to achieve focusing. An image pick up device drive circuit 15 controls the exposure time or shutter speed of the image pick up device 2. A synchronous signal generation circuit 16 generates a signal for synchronizing the operations of the respective circuits.

The operation of the object pick up circuit 3 will now be described with reference to FIGS. 2A, 2B and 2C.

The object pick up circuit 3 detects the unsharp width corresponding to the amount of unsharpness of the edge portion of the object image from the image pick up device 2 (see FIG. 2A), recognizes a distribution of the unsharp widths of the edges in a taken picture corresponding to the detected degree of focusing (see FIG. 2B), and sets the area of the major object from the distribution obtained in a focused image (see FIG. 2C).

The fundamental principle of the sight axis detection method by the sight axis detecting device, including the sight axis sensing optical system 8, the image sensor 9 and the sight axis pick up circuit 11 and so on, will now be described with reference to FIG. 3.

In the figure, a light source 104 for emitting an infrared radiation which is invisible to the observer is disposed on the focal plane of a projecting lens 106. The light source 104 may be a light-emitting diode.

The infrared radiation emitted from the light source 104 is converted into a beam made up of parallel rays of light by the projecting lens 106. The beam reflected by a half mirror 105 illuminates a cornea 101 of the eye-ball. At that time, a cornea reflecting image d based on part of the infrared radiation reflected by the surface of the cornea 101 passes through the half mirror 105, is condensed by a light-receiving lens 107 corresponding to the sight axis sensing optical system 8 shown in FIG. 1, and then is formed again at a position d' on an image sensor 109 corresponding to the detector 9 shown in FIG. 1.

Light beams from end portions a and b of an iris 103 pass through the half mirror 105 and the light-receiving lens 107, and then are led to the image sensor 109 to form images of the end portions a and b at positions a' and b'. When a rotational angle $\theta$ of an optical axis (2) of the eyeball relative to an optical axis (1) of the light-receiving lens 107 is small, a coordinate Zc of a central position c of the iris 103 is given by $$Zc \approx (Za+Zb)/2$$

where Za and Zb are Z coordinates of the end portions a and b of the iris 103, respectively.

Furthermore, where Zd is Z coordinate of the generated position d of the cornea reflecting image and OC is a distance between a center of curvature O of the cornea 101 and a center C of the iris 103, the rotational angle $\theta$ of the optical axis (2) of the eye-ball substantially satisfies the following equation:

$$OC \cdot \sin \theta \approx Zc - Zd \qquad (1)$$

It is therefore possible to obtain the rotational angle $\theta$ of the optical axis (2) of the eye-ball by detecting the positions of the respective singular points (the cornea reflecting image d and the end portions a and b of the iris) projected onto the image sensor 109. At that time, we have the following equation from equation (1):

$$\beta \cdot OC \cdot \sin \theta \approx \{(Za+Zb)/2\} - Zd \qquad (2)$$

where b is the magnification determined by both a distance L between the generated position d of the cornea reflecting image and the light-receiving lens 7 and a distance Lo between the light-receiving lens 107 and the image sensor 109, which is substantially a fixed value.

The direction of the sight axis (the looking point) of the observer's eye to be detected can be detected utilizing the above-described principle.

The operation of the control circuit of the first embodiment of the imaging apparatus according to the present invention will now be described with reference to FIGS. 4 through 6B.

Figure 5A:
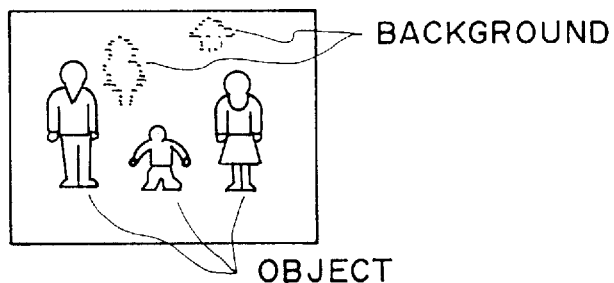
FIGS. 5A, 5B and 5C illustrate the operation explained in FIG. 4.
Figure 5B:
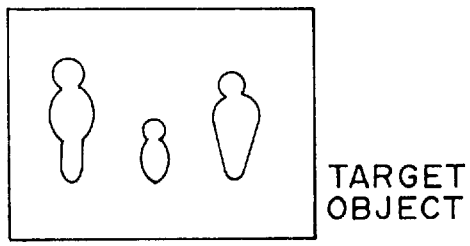
Figure 5C:
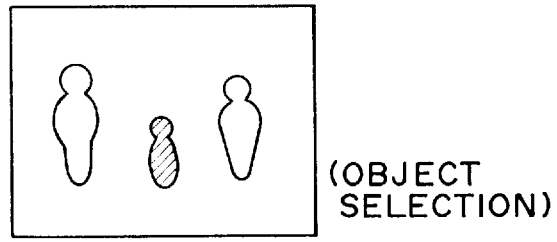

In step 101, the object information is taken in from the image pick up device 2 by the object pick up circuit 3 in the manner described above to pick up the objects in a focused state (see FIG. 5A). Next, in step 102, it is determined whether the number of picked up objects is one or greater. If the number of picked up objects is one, it means that the object area has already been specified, and the process goes to step 108. If the number of picked up images is two or greater, the process goes to step 103 to specify the major object. In this embodiment, since it is assumed that the number of objects is three, as shown in FIG. 5A, the process goes from step 102 to step 103. In step 103, the areas of the objects are set from, for example, the information on the unsharp widths, and images representing the frames of the areas are generated by the object frame generating circuit 4 on the basis of the area information (see FIG. 5B). In step 104, the generated images (the object frames) are supplied to the finder control circuit 5 to combine the object frames with the image signal. The obtained image is displayed on the display device 6.

At that time, the photographer is observing the image on the display device 6, such as an electronic viewfinder, through the eye-piece 7. The movement of the photographer's eye-ball during observation is detected by the detector 9 through the sight axis detection optical system 8, and the position of the sight axis is detected on the basis of the detected image of the eye-ball by the sight axis pick up circuit 11. Thus, the process goes to step 106 when it is determined in step 105 that an object pick up switch has been turned on. In step 106, the sight axis information generated by the sight axis pick up circuit 11 is supplied to the object information control circuit 12. In step 107, the area from the object pick up circuit 3 with which the position selected by the object information control circuit 12 coincides is determined as the object (see FIG. 5C) to specify the object area.

Figure 6A:
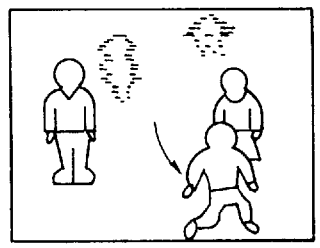
FIGS. 6A and 6B illustrate the operation explained in FIG. 4.
Figure 6B:
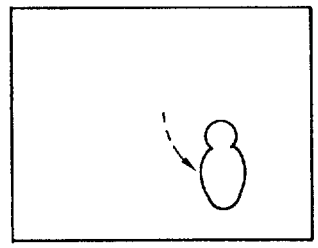

When the object area has been specified by the object information control circuit 12 in the manner described above, the process goes to step 108 to generate the major object information. In step 109, the taking lens 1 is driven by the taking lens drive circuit 14 and the image pick up device 2 is driven by the image pick up device drive circuit 15 utilizing the objected major object information.

Where the major object has shifted from the picked up position, as shown in FIG. 6A, it is tracked on the basis of the area information from the object pick up circuit 3 (see FIG. 6B), and the drive of the taking lens 1 by the taking lens drive circuit 14 and the drive of the image pick up device 2 by the image pick up device drive circuit 15 are thus continued utilizing the major object information obtained by tracking.

Where there are two or more objects, whether a selection has been made is determined by turning on the object pick up switch. However, such an arrangement may be replaced by a structure in which the positions to which the sight axis is directed are measured. The position having the highest frequency is automatically determined as the position to which the photographer looked most frequently, and the major object is automatically determined by the object information control circuit 12 using that position as the sight axis information. In addition, an unsharp width is used as the information in the image signal used to pick up the object. However, a luminance or color signal of the image signal or a combination of these signals may also be used as the information in the image signal used for picking up the object.

Figure 7:
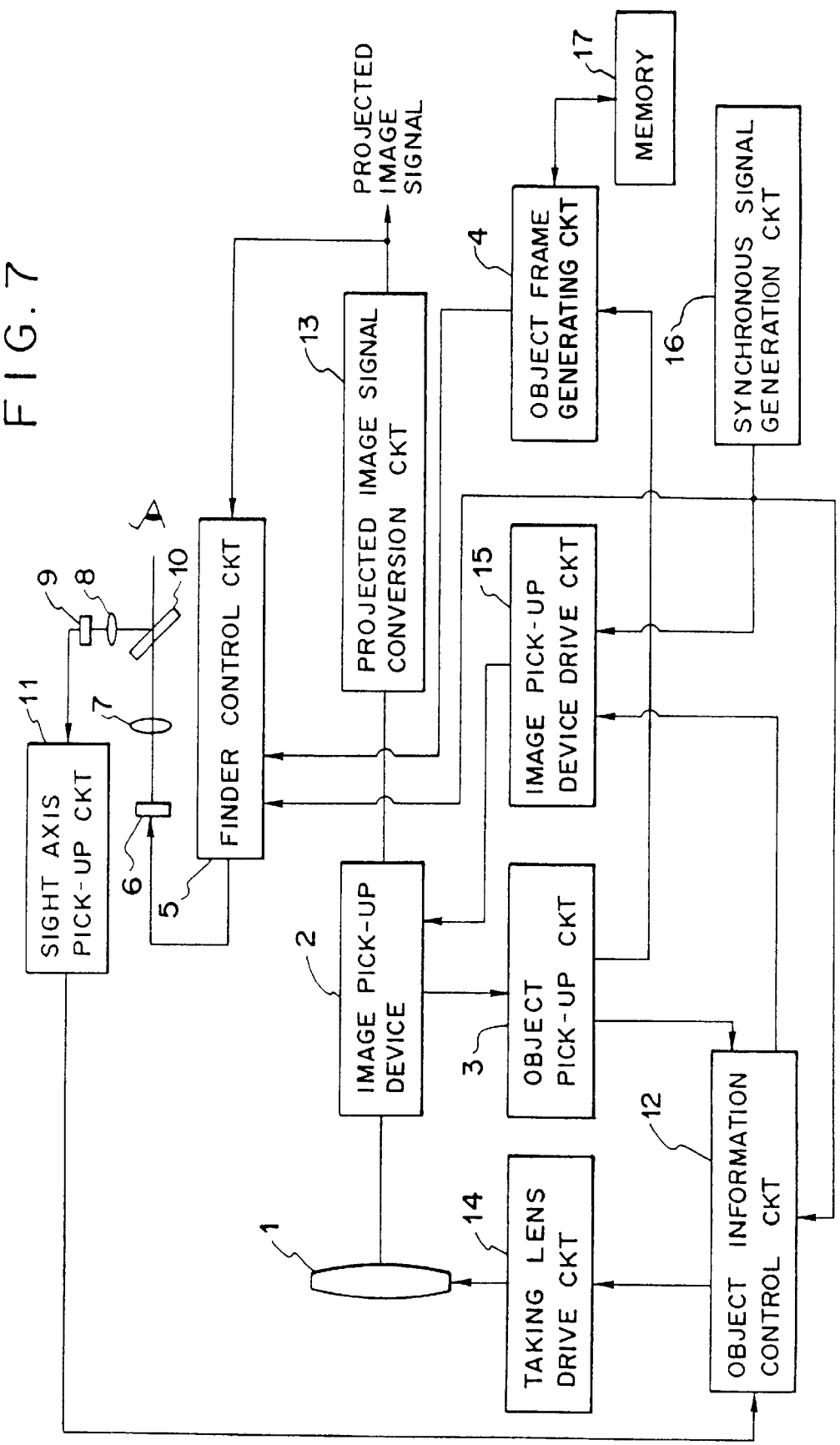
FIG. 7 is a block diagram of another embodiment of the imaging apparatus according to the present invention.

FIG. 7 is a block diagram of a second embodiment of the imaging apparatus according to the present invention. Identical reference numerals in the figure to those in FIG. 1 represent similar or identical elements.

In FIG. 7, a memory 17 temporarily stores the object frames.

In the second embodiment, the objects located at a plurality of object distances are picked up from the image signal by driving the focus lens group of the taking lens. The photographer determines the major object from the object frame in which the respective objects are displayed.

Figure 8:
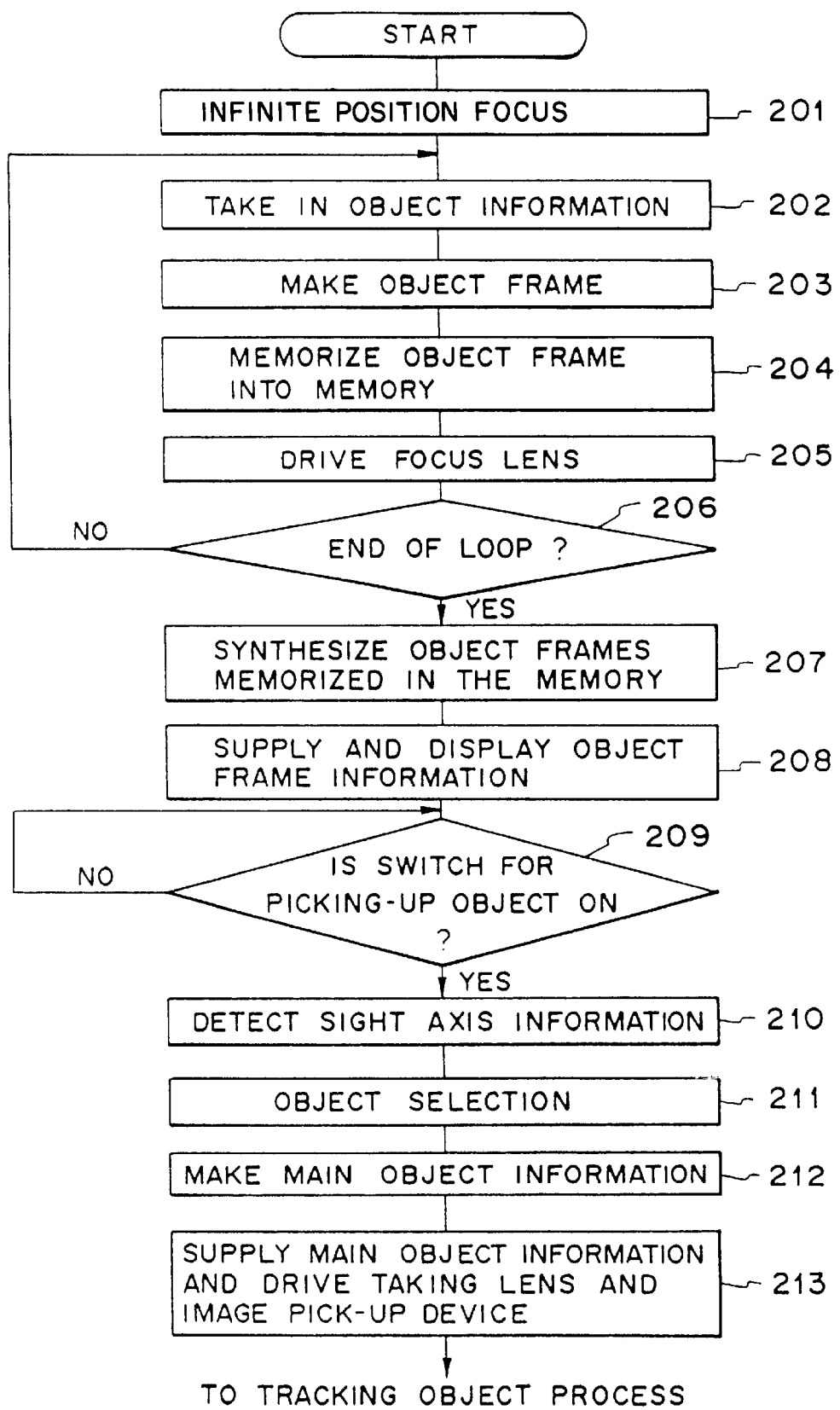
FIG. 8 is a flowchart showing the operation of the major portion of another embodiment of the imaging apparatus according to the present invention.
Figure 10A:
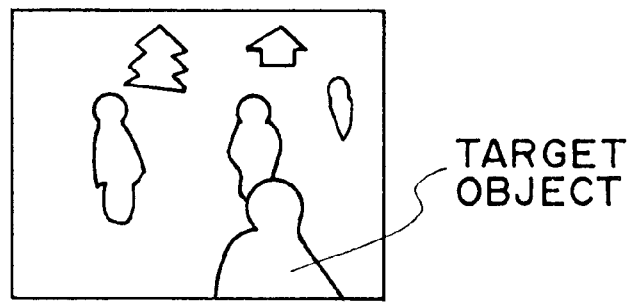
FIGS. 10A and 10B illustrate the operation explained in FIG. 8.
Figure 10B:
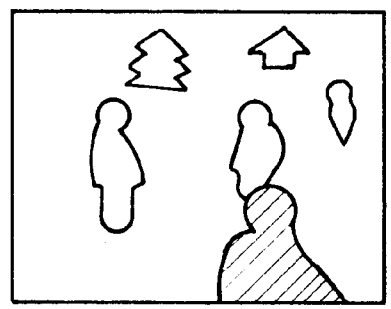

The operation of the second embodiment of the imaging apparatus according to the present invention will now be described with reference to FIGS. 8 through 10.

When the object is to be picked up by the photographer, the focusing lens in the taking lens 1 is set to the infinite position by the taking lens drive circuit 14 in step 201. Next, in step 202, the object information is taken in from the image pick up device 2 by the object pick up circuit 3 (see the left-side illustration of FIG. 9A). In step 203, the area of the object is set from the data on, for example, the unsharp width in the same manner as that of the first embodiment, and the image representing the frame of the area is generated on the basis of the area information by the object frame generating circuit 4 (see the right illustration of FIG. 9A). In step 204, the obtained image (the object frame) is stored in the memory 17. Next, in step 205, the focusing lens is driven by a predetermined amount toward the closer position to change the object distance. In step 206, it is determined whether the series of the above-mentioned operations are repeated a predetermined number of times.

If it is determined in step 206 that the series of the above-described operations have not been performed the predetermined number of times, the process returns to step 202 and the same operations are repeated. Since it is assumed in this embodiment that the series of the above operations are repeated five times, as shown in FIGS. 9A through 9D, the object frames picked up in all loops are sequentially stored in the memory 17.

When the focusing lens has been driven a predetermined number of times to generate the predetermined number of object frames, the process proceeds to step 207 to combine the object frames stored in the memory 17. Next, in step 208, the image of the combined object frame is supplied to the finder control circuit 5 and displayed on the display device 6 together with the projected image signal (see FIG. 10A).

At that time, the photographer is observing the image on the display device 6, such as an electronic viewfinder, through the eye-piece 7. The movement of the photographer's eye-ball during observation is detected by the detector 9 through the sight axis detection optical system 8, and the position of the sight axis is detected on the basis of the detected image of the eye-ball by the sight axis pick up circuit 11. Thus, the process goes to step 210 when it is determined in step 209 that an object pick up switch has been turned on. In step 210, the sight axis information generated by the sight axis pick up circuit 11 is supplied to the object information control circuit 12. In step 211, the area from the object pick up circuit 3 with which the position selected by the object information control circuit 12 coincides is determined as the object (see FIG. 10B) to specify the object area.

When the object area has been specified by the object information control circuit 12 in the manner described above, the process goes to step 212 to generate the major object information. In step 213, the taking lens 1 is driven by the taking lens drive circuit 14 and the image pick up device 2 is driven by the image pick up device drive circuit 15 utilizing the generator major object information.

Where the major object has shifted from the picked up position, it is tracked on the basis of the area information from the object pick up circuit 3, and the drive of the taking lens 1 by the taking lens drive circuit 14 and the drive of the image pick up device 2 by the image pick up device drive circuit 15 are thus continued utilizing the major object information obtained by tracking.

Where there are two or more objects, whether a selection has been made is made by turning on the object pick up switch. However, such an arrangement may be replaced by a structure in which the positions to which the sight axis is directed are measured. The position having the highest frequency is automatically determined as the position to which the photographer looked most frequently, and the major object is automatically determined by the object information control circuit 12 using that position as the sight axis information. In addition, an unsharp width is used as the information in the image signal used to pick up the object. However, a luminance or color signal of the image signal may also be used as the information in the image signal used for picking up the object, because the highest contrast is obtained in a focused state.

FIG. 11 is a block diagram of a third embodiment of the imaging apparatus according to the present invention. Identical reference numerals in the figure to those in FIGS. 1 and 7 represent similar or identical elements.

Figure 12:
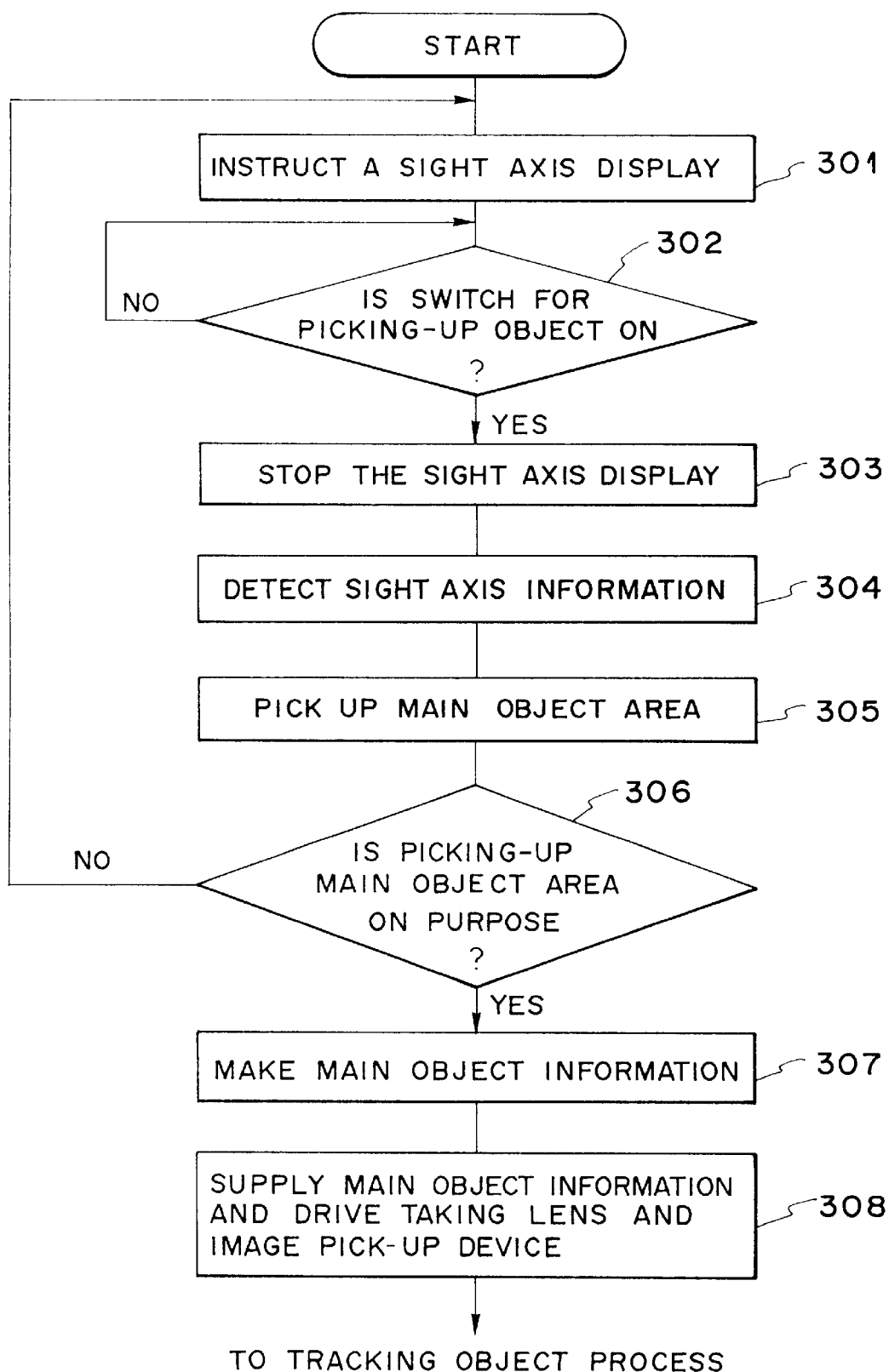
FIG. 12 is a flowchart showing the operation of the major portion of the still another embodiment of the imaging apparatus according to the present invention.
Figure 13A:
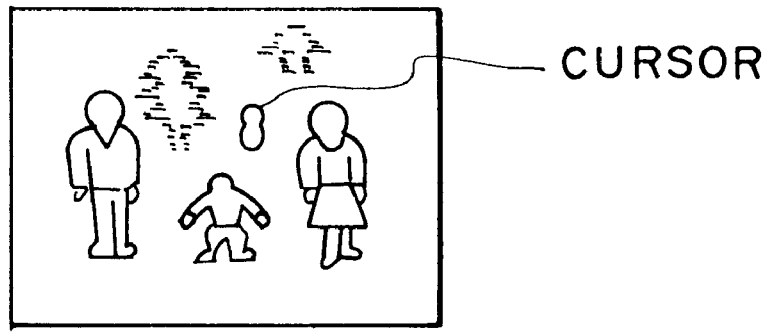
FIGS. 13A, 13B and 13C illustrate the operation explained in FIG. 12.
Figure 13B:
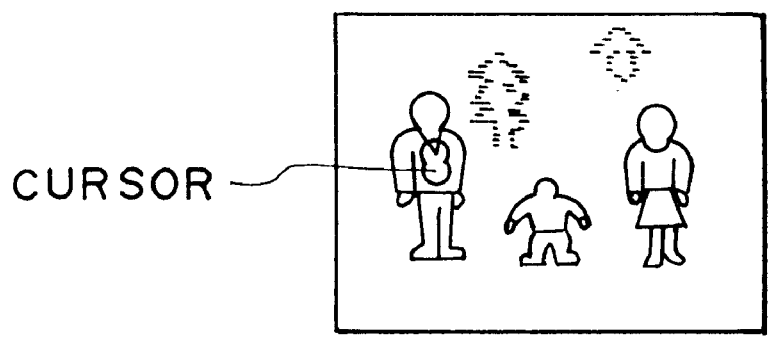
Figure 13C:
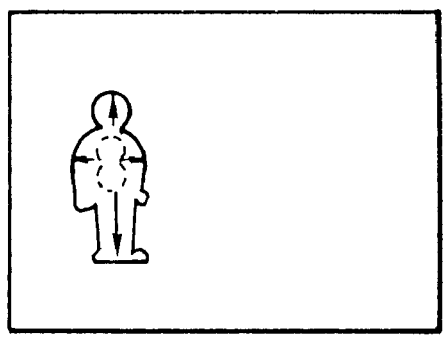

The third embodiment is characterized in that the area of the object is picked up on the basis of the projected image signal representing the portion of the taken picture on which the photographer fixes his or her eyes. The operation of the third embodiment will be described below with reference to FIGS. 12 through 13C.

When the object is to be picked up by the photographer, the object information control circuit 12 gives, to the finder control circuit 5, an instruction for displaying the position of the sight axis on the display device 6 in step 301. Consequently, the finder control circuit 5 displays a cursor on the display device 6 at the position determined by the sight axis information from the sight axis pick up circuit 11 (see FIGS. 13A and 13B). Next, in step 302, it is determined whether or not the object pick up switch has been turned on. If it is determined that the switch has been turned on, display of the cursor is suspended in step 303. Next, in step 304, the object pick up circuit 3 detects the sight axis information when the object pick up switch has been turned on. In step 306, it is determined whether or not the object picking up operation has succeeded. If the object picking up operation has not succeeded, the process returns to step 301. If the object picking up operation has succeeded, the process goes to step 307.

In step 307, the object area is set on the basis of the image signal near the sight axis position, and the set area information is supplied to the object information control circuit 12. Next, in step 308, the object information control circuit 12 generates the object area information on the basis of the area information (see FIG. 13C), and supplies it to the taking lens driving circuit 14 and the image pick up device drive circuit 15 to drive them.

Where the major object has shifted from the picked up position, it is tracked on the basis of the area information from the object pick up circuit 3, and the drive of the taking lens 1 by the taking lens drive circuit 14 and the drive of the image pick up device 2 by the image pick up device drive circuit 15 are thus continued utilizing the major object information obtained by tracking.

In each of the above embodiments, when there are a plurality of objects in the image data, the area is set for each of the objects, and the major object area is selected from among the areas on the basis of the photographer's sight axis information. Thus, the object area desired by the photographer, i.e., the area which is the object for the control of the operation, can be picked up on the real-time basis without requiring a special operation, and focusing of the lens on an undesired object or inadequate exposure, which would conventionally occur, can thus be eliminated.

In each of the above embodiments, the sight axis from the sight axis sensing device is used to select the major object area from the plurality of object areas. However, the present invention is not limited to this and selection of the major object area may be made by changing the cursor position displayed in a taken picture by dialing.

As will be understood from the foregoing description, the imaging apparatus according to the present invention includes area setting means for setting an area in a taken picture from an image signal from an image pick up device, and area selection means for selecting the desired area by an external operation, if the plurality of areas are set by the area setting means. Alternatively, the imaging apparatus according to the present invention includes area setting means for setting an area in a taken picture from an image signal from an image pick up device, sight axis sensing means for sensing a photographer's sight axis, and area selection means for selecting the desired area on the basis of the sight axis information from the sight axis sensing means, if the plurality of areas are set by the area setting means.

When a plurality of areas are set in the taken picture, the desired area is selected by the external operation or on the basis of the sight axis information automatically.

In the above-described embodiments, the object is recognized from the electrical output of the image pick up device 2 for tracking. However, in that case, when the object shifts suddenly, tracking may be delayed. The following embodiment is intended to improve this deficiency.

FIG. 14 is a block diagram of an automatic focusing device for video cameras in which an object recognizing device according to the present invention is incorporated.

In the figure, reference numeral 111 denotes an object; 112 denotes a taking lens; and 113 denotes an image pick up device, such as an area CCD. A signal processing circuit 114 generates a video signal of, for example, the NTSC method. A shape recognition circuit 115 recognizes the shape of the object from the signal from the signal processing circuit 114 by detecting, for example, the edge of the object. One form of such a shape recognition circuit 115 is disclosed in Japanese Patent Application Laid-Open No. 3-154576. A motion detecting circuit 116 detects the object's motion in a taken picture by the method which utilizes an optical flow or by the pattern matching process. One form of such a motion detecting circuit 116 is disclosed in Japanese Patent Application Laid-Open No. 2-117276.

A memory circuit 117 stores the shape recognition information of the object and the motion information thereof. A comparison circuit 118 compares, for example, the shape recognition or motion information of the object obtained in a previous field and stored in the memory circuit 117 with that obtained in the present field. A forecast circuit 119 forecasts a focus detection area from the difference information between the information from the memory circuit 117 and the information obtained by the comparison circuit 118. A high-pass filter 120 picks up the high-frequency component from an image signal. A gate setting circuit 121 sets the focus detection area according to the instruction of the forecast circuit 119. A detection circuit 122 produces a d.c. signal for focusing. A motor drive circuit 123 controls a focusing motor 124.

Figure 15:
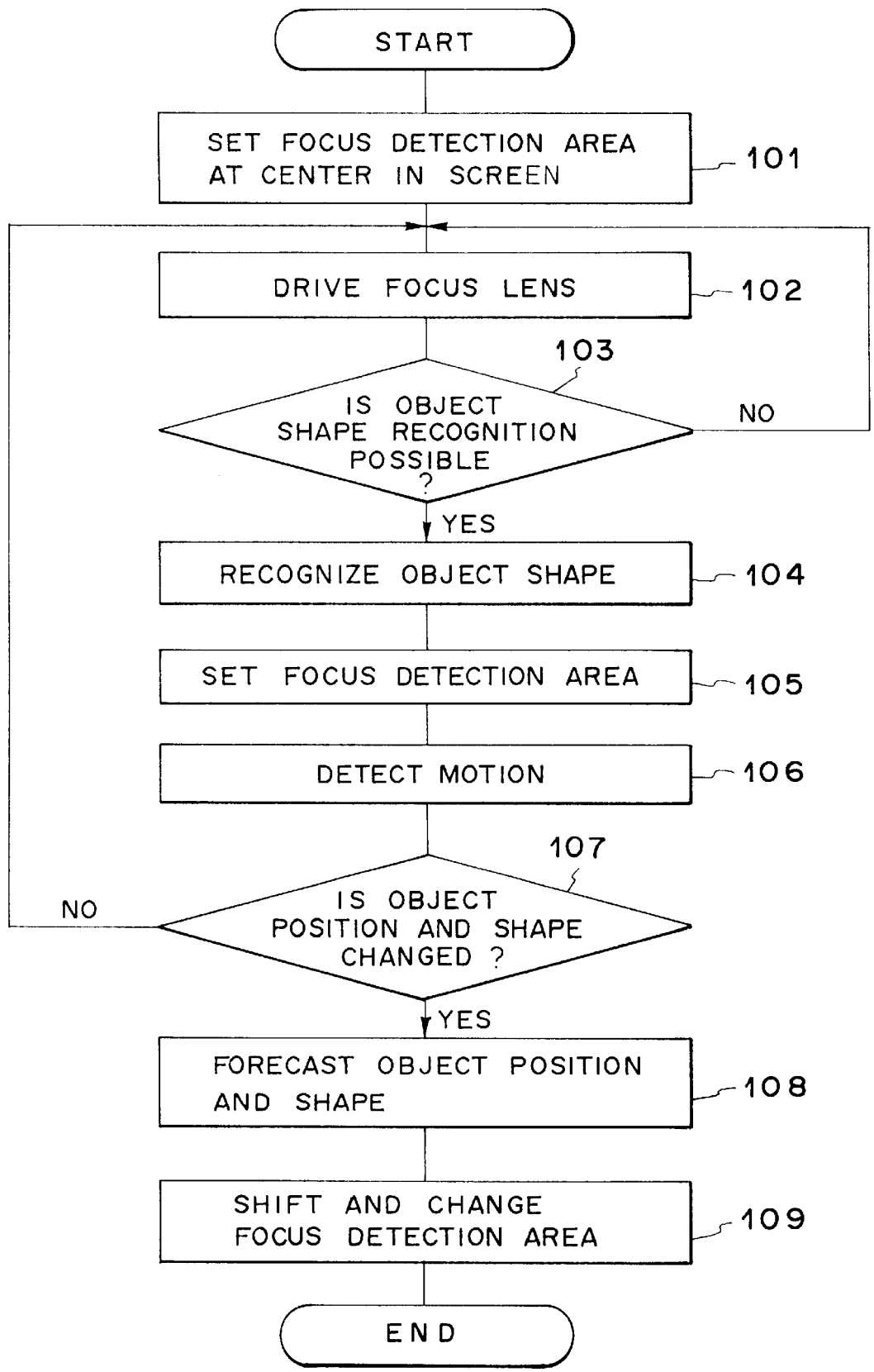
FIG. 15 is a flowchart showing the operation of the portion of the automatic focusing device shown in FIG. 14 which is associated with the present invention.

The operation of the portion of the automatic focusing device according to the present invention will now be described with reference to FIGS. 15 through 16D.

Figure 16A:
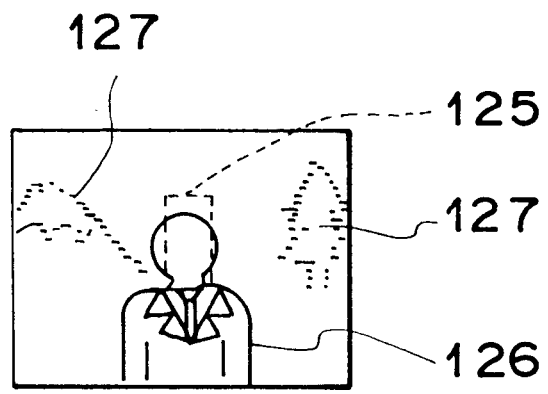
FIGS. 16A, 16B, 16C and 16D show the relation between a focus detection area and an object in order to illustrate the operation explained in FIG. 15.

When the power is turned on, the forecast circuit 119 outputs a signal to the gate setting circuit 111 to set the focus detection area having a predetermined size at the center of the taken picture. Thus, a focus detection area 125 is set at the center of the taken picture, as shown in FIG. 16A (step 101). Therefore, the focusing lens is driven on the basis of the high-frequency component obtained from the focus detection area 125 (step 102) and is focused on an object 126 at the center of the taken picture, as shown in FIG. 16A. In FIG. 16A, reference numeral 127 denotes a background.

Figure 16B:
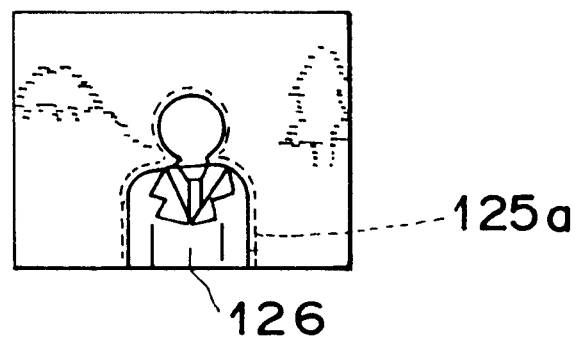

During this operation, when the image of the object has become sharp enough for shape recognition (step 103), the shape recognition circuit 116 recognizes the object shape (step 104), and outputs the obtained information to both the memory circuit 117 and the forecast circuit 119. Therefore, the forecast circuit 119 gives the size and position of a new focus detection area to the gate setting circuit 121, and the gate setting circuit 121 sets it (step 105). Since the focus detection area must contain the contour of the object, it must be larger than the object in size. A preferable size of the focus detection area is larger than the object shape by about several pixels, because a too large focus detection area may contain a background, generating a focusing failure caused by a combination of distant and nearby objects. FIG. 16B illustrates the relation between a new focus detection area 125a and the object 126 obtained when the new focus detection area is set. The illustration shown in FIG. 16B is the screen displayed in an EVF (electronic viewfinder).

Next, the motion of the object is detected by the motion detecting circuit 116 (step 106). In that state, the video camera is operated. If there are changes in the position and(/or) shape of the object on the screen during the operation, the amount of such a change is output from the comparison circuit 118 to the forecast circuit 119 (step 107). In the case of a video camera of the NTSC method, this signal can be generated for each [1/60] second. The forecasting circuit 119 forecasts the position and shape of the object at a subsequent time to set the focus detection area (step 108).

Forecasting is performed using any of the following techniques: the technique in which subsequent data is linearly forecast on the basis of two different data items obtained at a previous time or the technique in which subsequent data is forecast by allocating a previous three or more data items to a curve having a secondary order or greater. In order to prevent erroneous forecasting due to shake of the image by about 1 or 2 pixels by electrical noise, data obtained by smoothing the previous data may be used for forecasting.

Figure 16C:
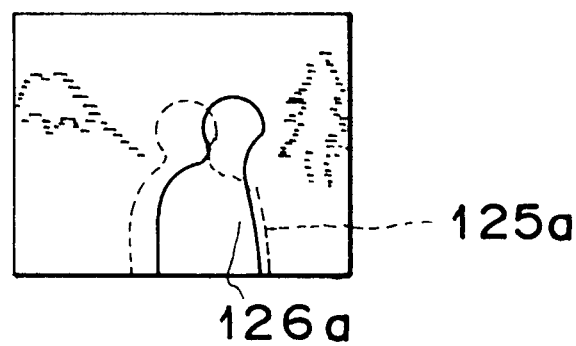
Figure 16D:
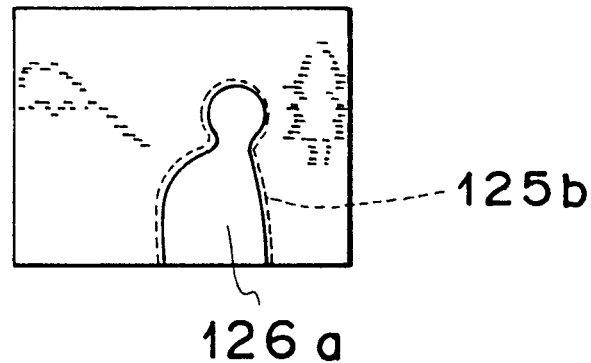

Thus, the focus detection area 125b follows the motion of the object 126a, as shown in FIG. 16D (step 109). In this way, focusing failure caused by a combination of distant and nearby objects can be prevented. More specifically, if updating of the focus detection area is delayed and the focus detection area remains unmoved, the background enters the detection area 125a, as shown in FIG. 16C. If the background has a high contrast, the focused condition becomes unstable. This may lead to focusing of the lens on the background. This problem can securely be solved by making the focus detection area 125b follow the motion (position) and shape of the object 126a, as shown in FIG. 16D. It is, however, to be noted that it takes time for the object shape to be recognized. Thus, to make the focus detection area 125b follow the object is slightly delayed.

Figure 17:
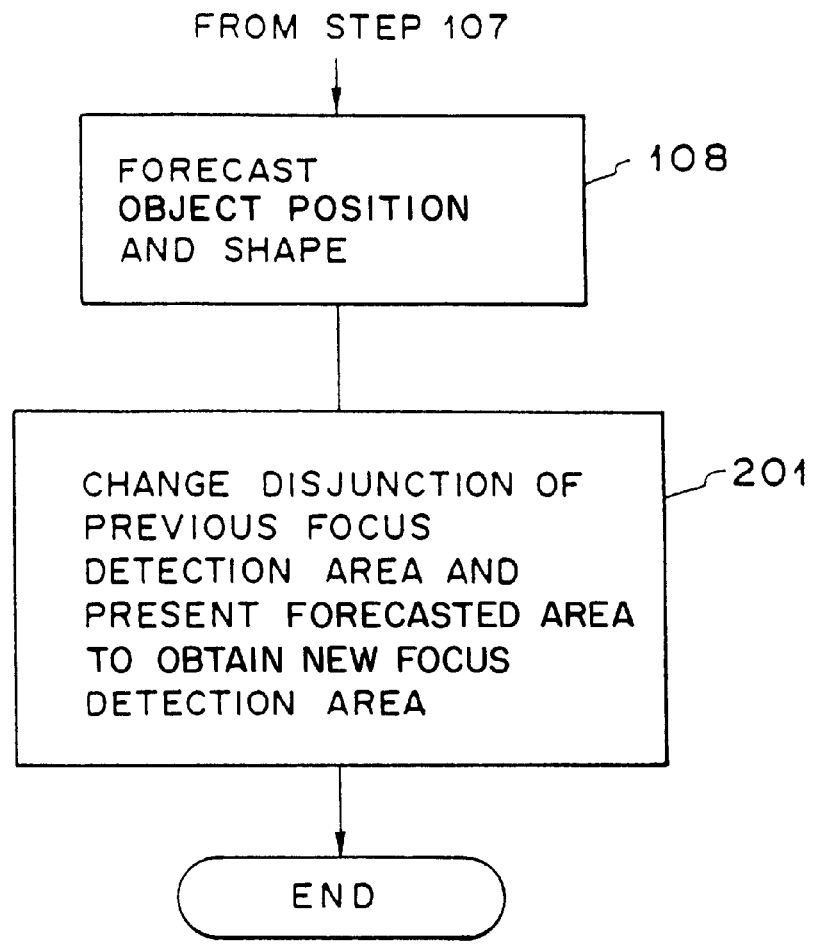
FIG. 17 is a flowchart showing the operation of the essential parts of still another embodiment of the automatic focusing device according to the present invention.

FIG. 17 is a flowchart showing the operation of the major portion of another embodiment of the automatic focusing device according to the present invention. This operation will be described below with reference to FIG. 18.

The operation of this embodiment is the same until after new position and shape of the object are forecast when there are changes in the position and shape of the object in the screen. That is, the operation is the same as that of the previous embodiment from step 101 to step 108 and no further, description of that portion is provided.

In this embodiment, when the new position and shape of the object are forecast in step 108, the focus detection area is enlarged in a direction in which a change has taken place in step 201. That is, a logical OR operation is conducted on the previous focus detection areas and the presently forecast focus detection area to obtain a new focus detection area In this way, the opposite effect to what was intended, which may be obtained when erroneous forecasting occurs, can be eliminated. In other words, since the probability at which the object is taken in the focus detection area increases the, stability of focusing is enhanced.

Figure 18:
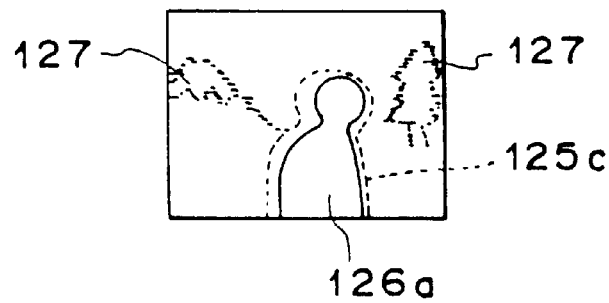
FIG. 18 shows the relation between the focus detection area and the object in order to illustrate the operation explained in FIG. 17.

FIG. 18 illustrates the relation between a focus detection area 125c and the object 126a obtained in this embodiment. In this case, although the background has entered the focus detection area 125c, since the edge of the object 126a to which the focusing lens is focused currently is all within the focus detection area 126a, unlike the case shown in FIG. 16C, focusing is less affected by the defocused edge of the background.

In each of the above embodiments, the shape and motion of the object are recognized, and new shape and position of the focus detection area are forecast on the basis of the results of the recognition. Consequently, even when the motion of the object or camera shake is great or even when it takes time for the object shape to be recognized, stable focusing is assured.

In each of the above-described embodiments, the focus detection area tracks the object which shifts in a horizontal direction. In the operation of the video camera, e.g., zooming, the size of the object changes. The following embodiment is intended to cope with such a case.

FIG. 19 is a block diagram of another embodiment of the automatic focusing device for video cameras according to the present invention.

In the figure, reference numeral 211 denotes an object; 212 denotes a taking lens; and 213 denotes an image pick up device, such as an area CCD. A signal processing circuit 214 generates a video signal of, for example, the NTSC method. A zoom encoder 215 reads the zooming condition of the lens 212. A shape recognition circuit 216 recognizes the shape of the object on the screen by detecting the edge of the object. One form of such a shape recognition circuit 216 is disclosed in Japanese Patent Laid-Open No. 3-154576. A memory circuit 217 stores information from the shape recognition circuit 216. A forecast circuit 218 forecasts the size of the focus detection area from the output of the zoom encoder 215 and the object shape information from the memory circuit 217. A high-pass filter 219 picks up the high-frequency component from a signal of the signal processing circuit 214. A gate setting circuit 220 sets the focus detection area according to the signal of the forecast circuit 218. A detection circuit 221 produces a d.c. signal for focusing. A motor drive circuit 222 controls a focusing motor 223.

Figure 21A:
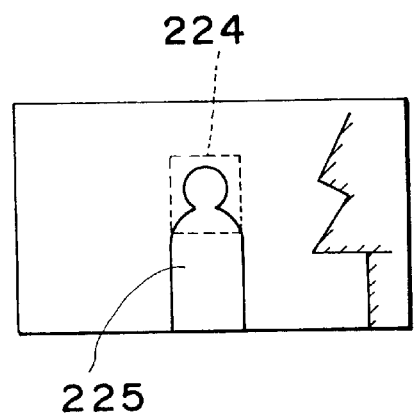
FIGS. 21A, 21B, 21C and 21D show the relation between the focus detection area and the object in order to illustrate the operation explained in FIG. 20.
Figure 21B:
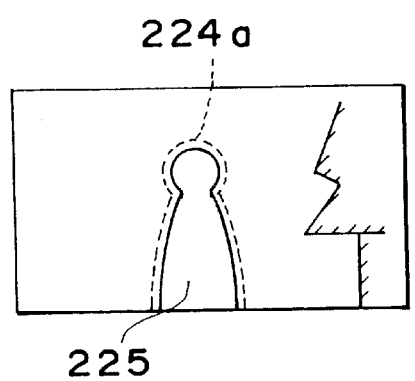
Figure 21C:
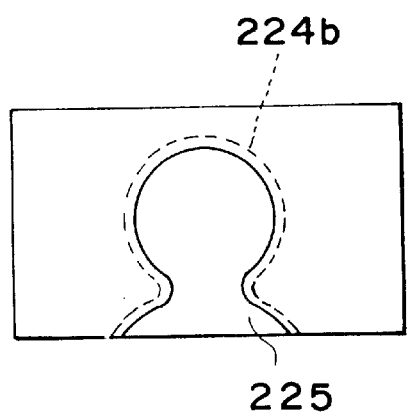
Figure 21D:
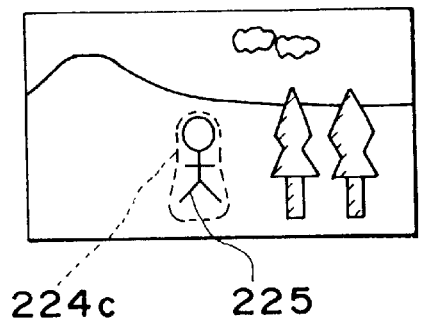

The operation of the portion of the video camera according to the present invention will now be described with reference to FIGS. 20 through 21D.

When the video camera is switched, the forecast circuit 218 outputs an instruction signal to the gate setting circuit 220 to set the focus detection area having a predetermined size at the center of the taken picture. Thus, a focus detection area 224 is set at the center of the taken picture, as shown in FIG. 21A (step 101). Therefore, the focusing lens is driven on the basis of the high-frequency component obtained by the focus detection area 224 (step 102) and is focused on an object 225 at the center of the taken picture, as shown in FIG. 21A. During this operation, when the image of the object has become sharp enough for shape recognition (step 103), the shape recognition circuit 216 recognizes the object shape (step 104). Upon receipt of the object shape information through the memory circuit 217, the forecast circuit 218 gives the size and position of the focus detection area to the gate setting circuit 220 (step 105). Since the focus detection area 224 must contain the contour of the object 225, it must be larger than the object in size. A preferable size of the focus detection area is larger than the object shape by about several pixels, because a too large focus detection area may contain a background, generating a focusing failure caused by a combination of distant and nearby objects. FIG. 21B illustrates the relation between a focus detection area 224a and the object 225 obtained when the focus detection area is set.

Next, the zooming condition is detected by the zoom encoder 213 (step 106). If zooming is not being done the, series of the above operations are repeated. If zooming is being done, the zooming information is input from the zooming encoder 215 to the forecast circuit 218. Thus, the forecast circuit 218 forecasts the size and position of the object 225 at a subsequent frame (field) to set the focus detection area again.

In a practical operation, in the zooming operation which is conducted from the wide-angle end to the telephoto end, since the object shape increases, the focus detection area is relatively increased (steps 107→108→110). Conversely, in the zooming operation which is conducted from the telephoto end to the wide-angle end, since the object shape decreases, the focus detection area is reduced together with the object shape (steps 107→109→110).

The forecast circuit 218 sets the focus detection area such that it matches the object whose size changes according to the zooming condition. This is illustrated in FIGS. 21C and 21D.

Thus, since the size of the focus detection area is set according to the recognized object shape, i.e., since the focus detection area is made to follow the size of the object on the screen, impairment of the stability of the focused condition is prevented.

Figure 22:
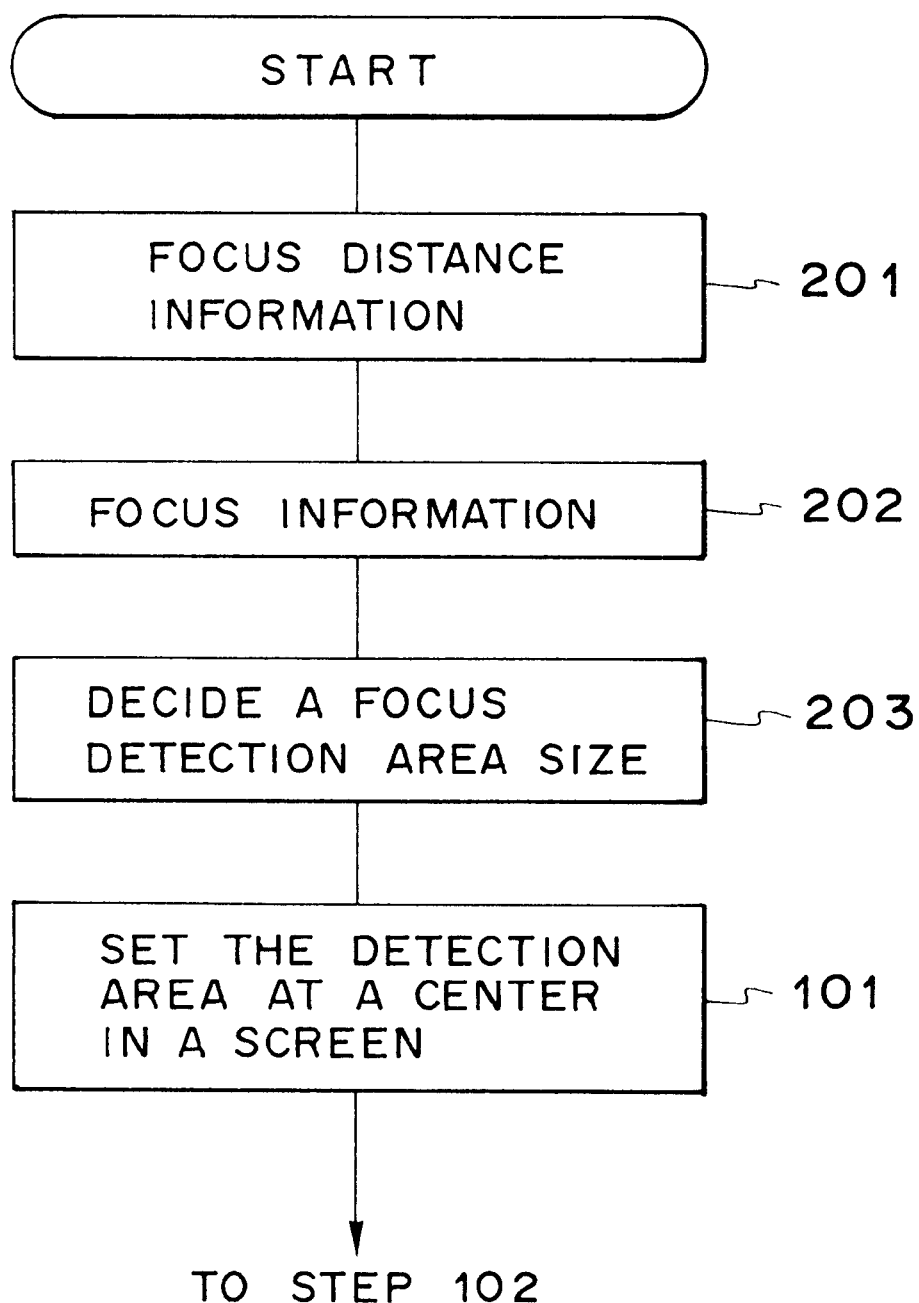
FIG. 22 is a flowchart showing the operation of the major portion of another embodiment of the video camera according to the present invention.

FIG. 22 is a flowchart showing part of the operation of another embodiment according to the present invention. FIG. 22 shows only part of the operation which differs from that shown in FIG. 20. The circuit configuration of this embodiment is almost the same as that of the previous embodiment, and no further description thereof is provided.

In the above embodiment, the focus detection area having a predetermined size is set at the center of the screen when the video camera is switched on. However, when the focus detection area is a fixed one, as in the case of the previous embodiment, a very large or small object may not be adequately aligned with the focus detection area. Thus, the focused condition may not be able to be obtained, making object shape recognition difficult.

Hence, in this embodiment, the zooming and focusing information (which are obtained from a focus detection circuit (not shown) in the case of the structure shown in FIG. 19) are input before the initial focus detection area is set, as shown in FIG. 22 (step 201→202). Thus, the forecasting circuit 218 forecasts the size and position of the focus detection area (step 203), and initially sets the obtained size and position (step 101).

Figure 23A:
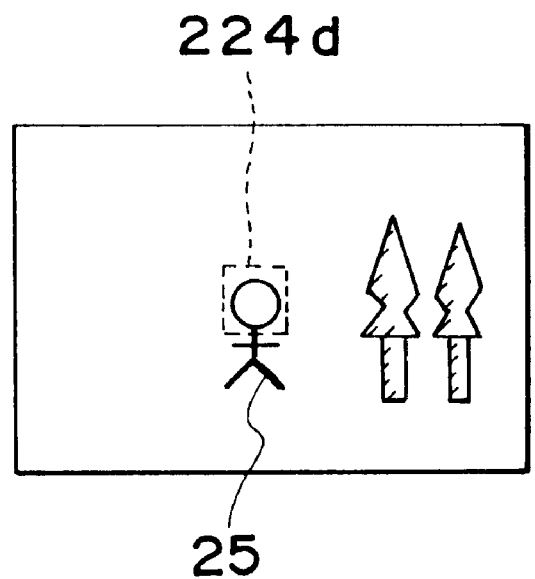
FIGS. 23A and 23B show the relation between the size of the focus detection area and the size of the object in order to illustrate the operation explained in FIG. 22.
Figure 23B:
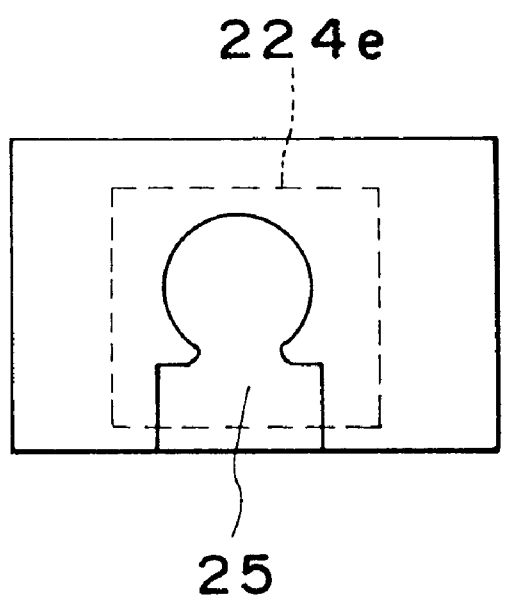

If the zoom lens is at the wide-angle end or if the object distance is distant, since the object 225 is small, as shown in FIG. 23A, a small focus detection area 224d is set. If the zoom lens is at the telephoto end or if the object distance is close, since the object 225 is large, as shown in FIG. 23B, a large focus detection area 224e is set.

Thereafter, the process goes to step 102 shown in FIG. 20.

In addition to the advantage provided by the previous embodiment, this embodiment has an advantage in that the probability with which the object enters the focus detection area from the beginning is increased, further preventing erroneous focusing.

As will be understood from the foregoing description, in the present invention, even when the size of the object on the screen varies due to zooming, the optimum focusing condition can be performed. A forecasting means is provided, which forecasts changes in the shape of the object on the screen from both the zooming information obtained by the zoom detection means and the information from the shape recognition means, and instructs the shape of the focus detection area to the area setting means according to the results of the forecasting. Changes in the shape of the object on the screen are forecast from both the zooming information obtained by the zooming detection means incorporated in the imaging device and the information from the shape recognition means, and the shape of the focus detection area is instructed to the area setting means according to the results of the forecasting so as to make the shape of the focus detection area follow the shape of the object.

Devices for synthesizing an image, such as characters, on the screen are known. With one type of such a device, the camera photographer prepares a still picture, such as a title or illustration, and takes a video of such a still picture, whereby the video camera stores the still picture in a memory circuit in a binary form. The synthesizing device synthesizes the still picture stored in the memory circuit with the screen of a scene. With another type of synthesizing device, many types of images are stored in the memory circuit beforehand. A desired image output from the memory circuit is synthesized on an image.

Figure 34:
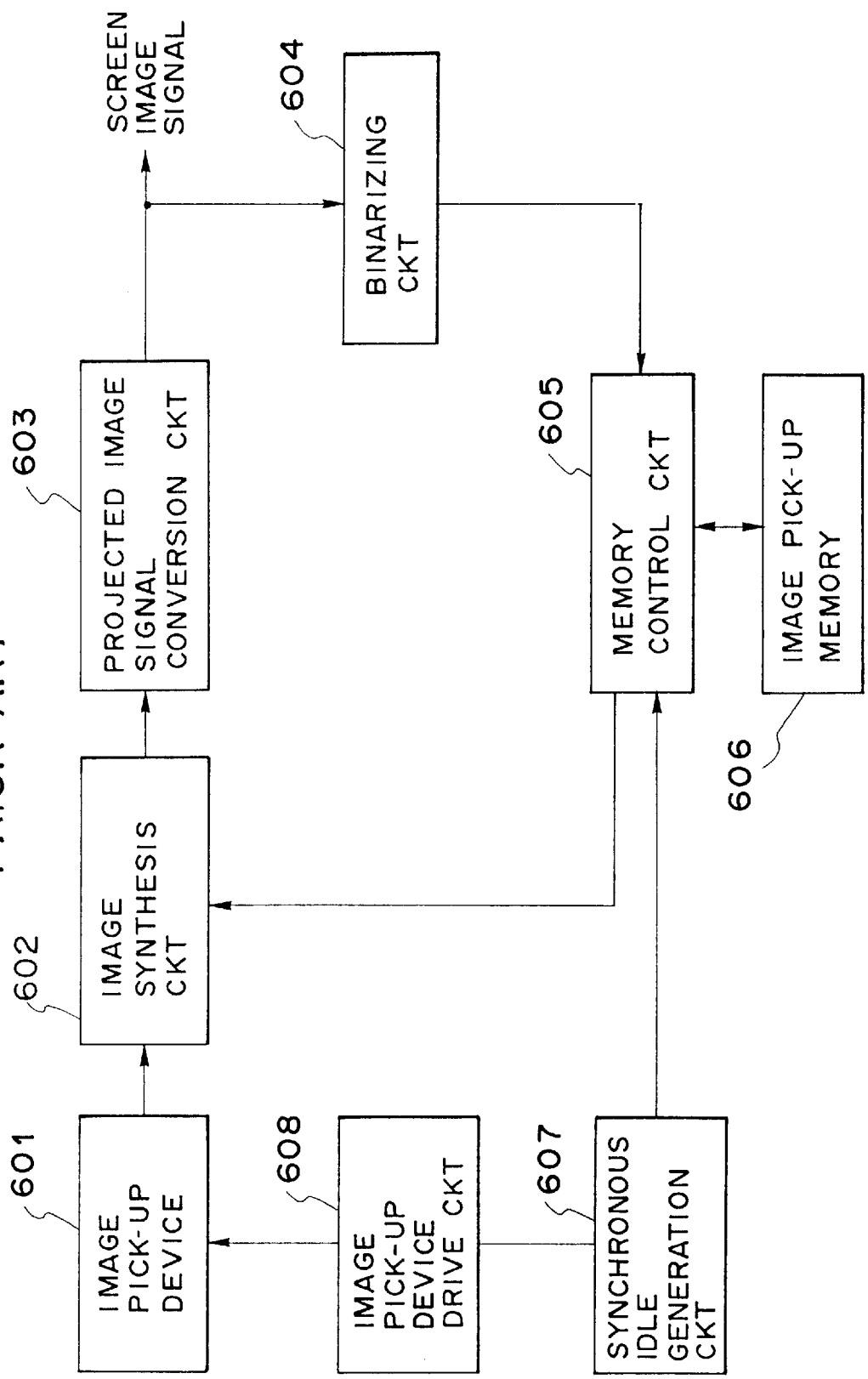
FIG. 34 is a block diagram showing the conventional imaging apparatus.

FIG. 34 is a block diagram showing the essential parts of an imaging apparatus with a conventional function of the above-described type.

First, the operation of reading in an image will be described.

A still picture signal, such as a title, from an image pick up device 601 is input to a projected image signal conversion circuit 603 through an image synthesis circuit 602. The projected image signal conversion circuit 603 converts the still picture signal into a projected image signal conforming to the television standard, and supplies the resultant signal to a binarization circuit 604. The binarization circuit 604 converts the analog projected image signal into a digital projected image signal, compares the resultant projected image signal with a predetermined signal level, and supplies obtained binary image data to a memory control circuit 605. The memory control circuit 605 writes the binary image data of a single screen to an image memory 606 which may be a static RAM.

The image synthesizing operation will now be described.

The memory control circuit 605 supplies the image data read out from the image memory 607 to the image synthesizing circuit 608 on the basis of the synchronous signal from the synchronous signal generation circuit 607. Also, the memory control circuit 605 controls the operation of the image synthesizing circuit 602 to synthesize the still picture with the shot obtained by the image pick up device. Also, the memory control circuit 605 converts the color of the stored image and converts the three RGB primary color signals of the image data into luminance and color difference signals.

In the conventional device of FIG. 34, since the still picture image is synthesized with the shot in a format stored in the image memory 606, if the object is at a rest, it is possible for the photographer to have an intended image by locating the object on the portion of the screen other than the area of, for example, the title. However, if the object is a moving image, it may be overlapped on the still picture on the screen. This may preclude the photographer from having an intended image or necessitates a troublesome camera operation, e.g., requires the photographer to shoot a scene with the image to be synthesized taken into consideration.

Methods of synthesizing images with the video pictures after shooting has been ended using a special device, a so-called editor, are also known. However, synthesis of images using the editor requires purchase of an editor and a complicated editing operation.

In view of the above-described problems, the present invention provides an imaging apparatus which is capable of synthesizing images without requiring a complicated operation and without degrading the images used for synthesis.

Figure 24:
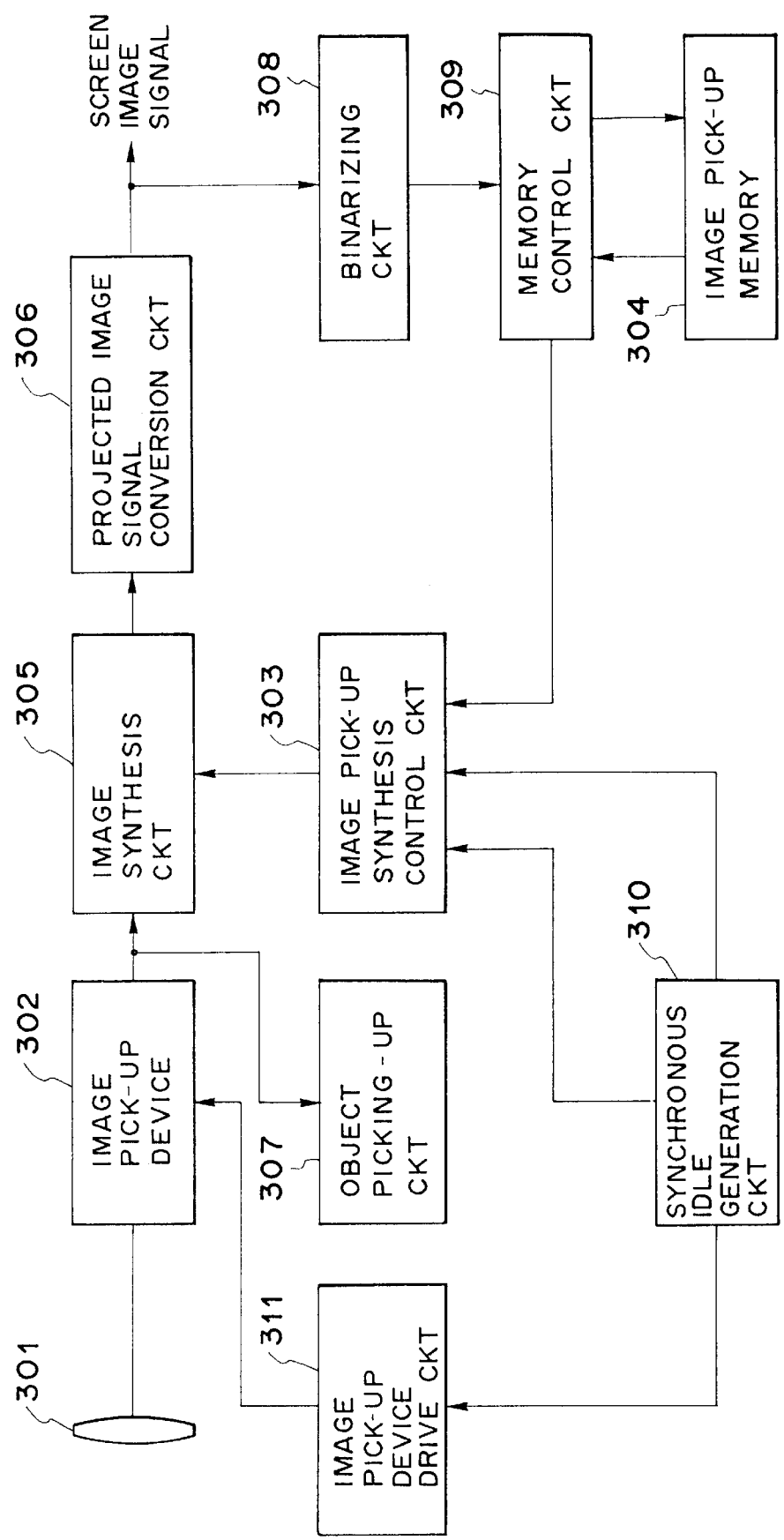
FIG. 24 is a block diagram of still another embodiment of the imaging apparatus according to the present invention.

FIG. 24 is a block diagram of an eighth embodiment of an imaging apparatus according to the present invention. In the figure, reference numeral 301 denotes a photographic optical system; 302 denotes an image pick up device; 303 denotes an image pick up synthesis control circuit for controlling synthesis of images; 304 denotes an image memory for storing image data; 305 denotes an image synthesis circuit for synthesizing the image signal from the image pick up circuit 302 with the image signal from the image memory 304; 306 denotes a projected image signal conversion circuit for converting the image signal from the image pick up device 302 or the image signal obtained by the image synthesis circuit 305 by synthesis into a screen image signal conforming to the television standard; 307 denotes an object picking-up circuit for picking up the object area from the image signal from the image pick up device 302; 308 denotes a binarization circuit for binarizing an image according to the luminance of the image signal from the image pick up device 302; 309 denotes a memory control circuit for storing the image from the binarization circuit 308 to the image memory 304 or reading out the image signal stored in the image memory 304, when necessary, for converting the color of the stored image, and for converting RGB three primary color signals of the image data into luminance and color difference signals; 310 denotes a synchronous signal generation circuit for generating a signal for synchronization; and 311 denotes an image pick up device drive circuit for controlling the operation of the image pick up device 302.

Figure 25A:
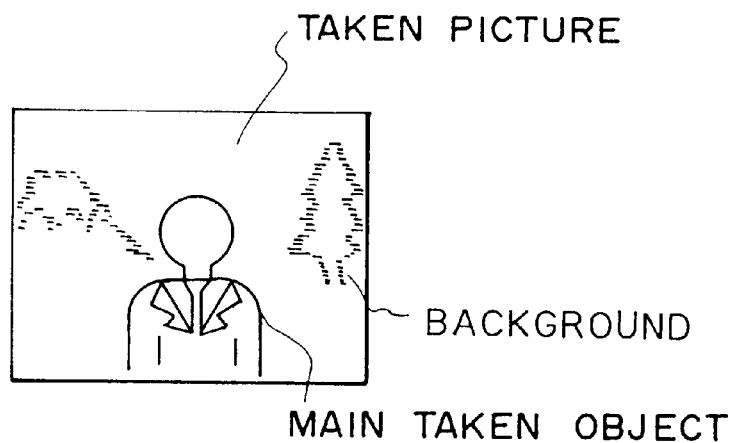
FIGS. 25A, 25B and 25C illustrate the operation carried out in an object picking-up device of FIG. 24.
Figure 25B:
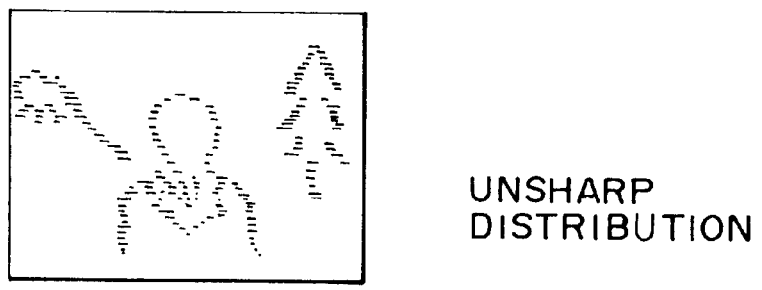

The operation of the object picking-up circuit 307 will now be described with reference to FIGS. 25A, 25B and 25C.

Figure 25C:
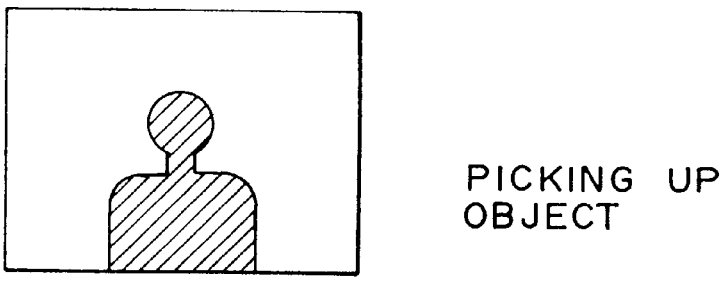

The object picking-up circuit 307 detects the unsharp widths of the edge portions of the object image from the image pick up device 302 corresponding to the amount of unsharpness (see FIG. 25A), recognizes a distribution of the unsharp widths of the edges on an image screen at a detected degree of focusing (see FIG. 25B), and sets the area of the major object from the distribution obtained under a focused condition (see FIG. 25C).

The operation of the major portion of the imaging apparatus according to the eighth embodiment of the present invention will be described below with reference to FIGS. 26 and 27. In this embodiment, it is assumed that the video camera photographer has prepared the still picture representing the title and has shot it using the imaging apparatus to obtain an image for synthesis. Thus, the obtained image has already been binarized and stored in the image memory 304.

If it is determined that the photographer has given an instruction of image synthesis in step 101, the image (hereinafter referred to as an synthesized image) data for synthesis is taken in from the image memory 304 to the image pick up synthesis control circuit 303 through the memory control circuit 309 in step 102. Next, in step 103, the area of the entire screen to be occupied by the synthesized image is detected from the synthesized image data (see FIG. 27). In step 104, the data on the area of the object is taken in from the object pick up circuit 307. Thereafter, in steps 105 and 106, it is determined whether the area of the object interferes with the area of the synthesized image. FIG. 28A illustrates an example in which the object area interferes with the area of the synthesized image. FIG. 28B illustrates an example in which they do not interfere with each other. If it is determined that both areas do not interfere with each other, the process advances to step 108 to synthesize the image in the image memory 304 with the image the photographer has shot with the video camera without changing it. If both areas interfere with each other, the process advances to step 107 to perform what is called affine transformation, such as translation, enlargement/reduction or rotation, on the image from the image memory 306 to provide an image which neither interferes with nor superimposes the object (see FIG. 28C). Subsequently, in step 108, the transformed image is supplied to the image synthesis circuit 305.

If image synthesis is performed on plural screens, the process returns from step 109 to step 102 to repeat a series of the above-described operations.

Thus, the image synthesis circuit 305 synthesizes the image signal supplied from the image pick up synthesis control circuit 303 with the same image signal as that used to recognize the object (see FIG. 28D), and supplies the synthesized image to the projected image signal conversion circuit 306.

Which type of image transformation is performed by the image pick up synthesis control circuit 303 may be designated beforehand by the photographer or be automatically selected by the image pick up synthesis control circuit 303 according to the motion of the object.

Furthermore, in order to reduce the delay of a screen image signal due to calculation, an image signal representing the screen preceding by a few frames may be used as the projected image signal used to determine the type of transformation of an image. Furthermore, the synthesized image may be a color image stored in the image memory 304 beforehand.

Furthermore, when the memory control circuit 309 stores a binarized synthesized image in the image memory 304, it may calculate the area on the screen the stored image occupies, and store both the image area and image data in the image memory 304.

Furthermore, the imaging signal used to pick up an object may not be an unsharp width but rather luminance or color difference signals or a combination of these signals.

FIGS. 29A to 29D illustrate the operation of the ninth embodiment according to present invention.

The circuit configuration of this embodiment is the same as that of the eighth embodiment except for the transformation process conducted to synthesize a still picture, such as a title, stored in the image memory 304. Thus, the synthesizing operation will be described with reference to FIGS. 29A to 29D.

Figure 29A:
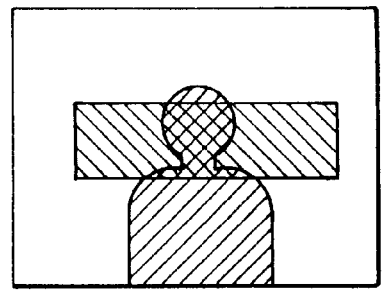
FIGS. 29A, 29B, 29C and 29D illustrate the operation of the portion of still another embodiment according to the present invention.
Figure 29B:
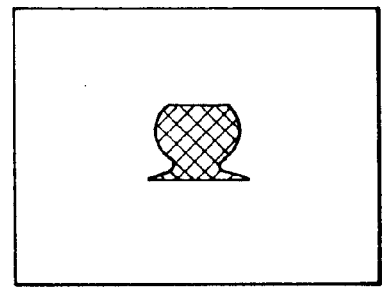
Figure 29C:
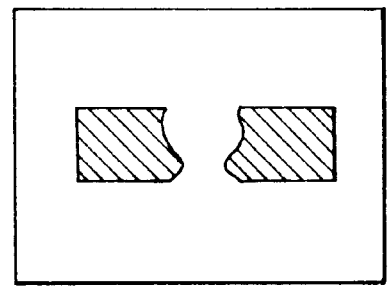
Figure 29D:
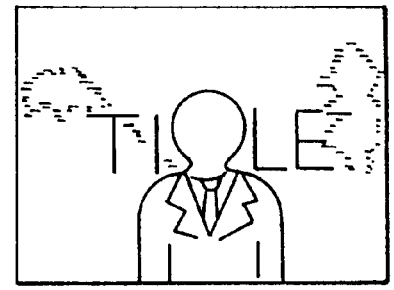

If the image pick up synthesis control circuit 303 determines that the object area interferes with the synthesized image (see FIG. 29A), the area where the two areas intersect is picked up (see FIG. 29B). The picked up area is subtracted from the synthesized image area (see FIG. 29C), and the remaining area of the synthesized image is supplied to the image synthesis circuit 305. Consequently, a synthesized image, such as that shown in FIG. 29D, is supplied from the image synthesis circuit 305 to the projected image signal conversion circuit 306.

FIG. 30 is a block diagram of a tenth embodiment of the imaging apparatus according to the present invention. This embodiment is structured such that the magnification of the photographic optical system 301 is controlled on the basis of the area determination by the image pick up synthesis control circuit 303. Identical reference numerals in FIG. 30 to those in FIG. 24 represent similar or identical elements.

In FIG. 30, reference numeral 312 denotes a photographic optical system drive circuit for driving the photographic optical system 301; and 313 denotes an image memory for storing an image to be synthesized (which may be an image shown in FIG. 32B) beforehand.

Figure 31:
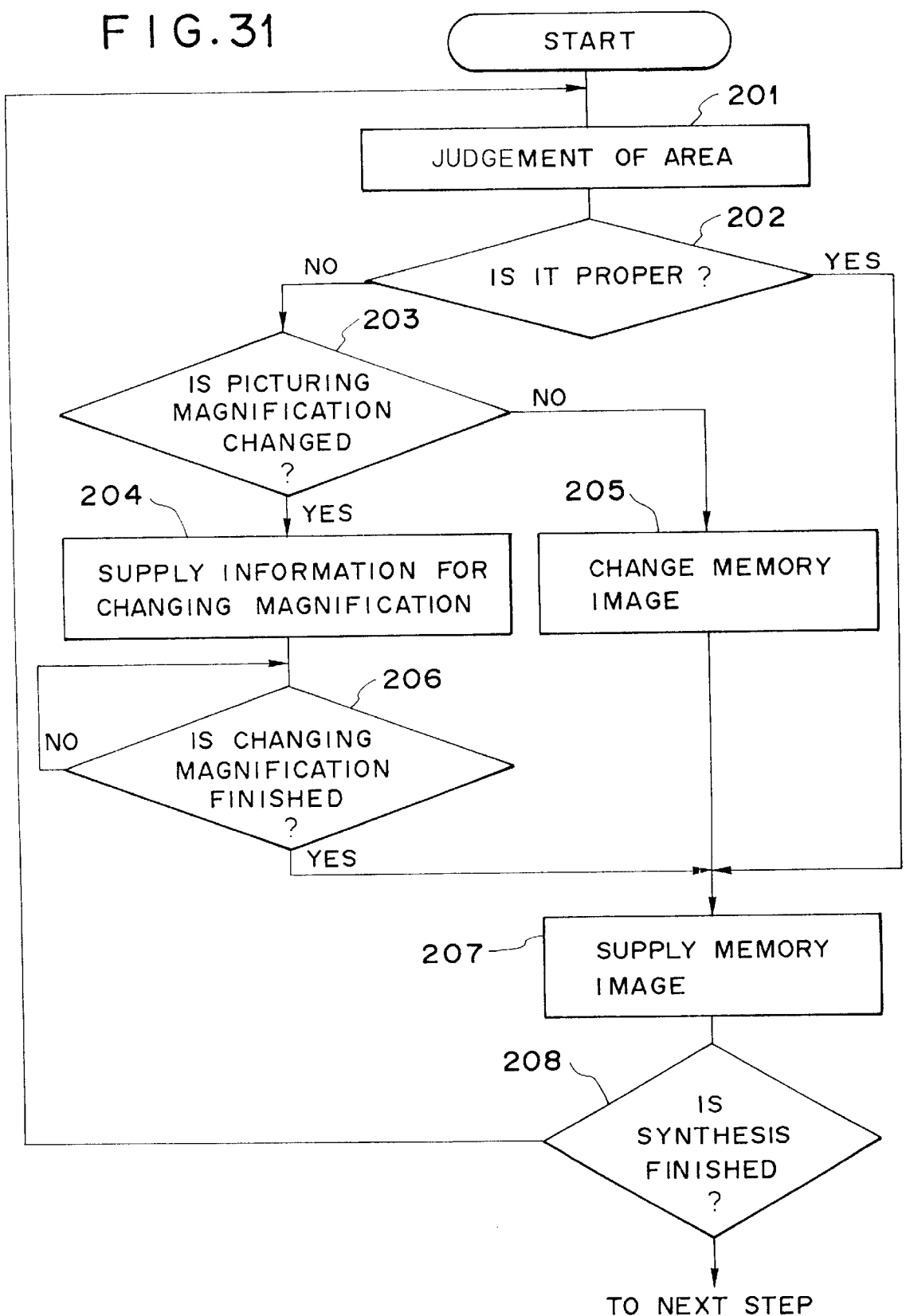
FIG. 31 is a flowchart showing the operation of the portion of the imaging apparatus shown in FIG. 30 which is associated with the present invention.

The operation of the tenth embodiment will be described below with reference to FIGS. 31 to 32E.

Figure 32A:
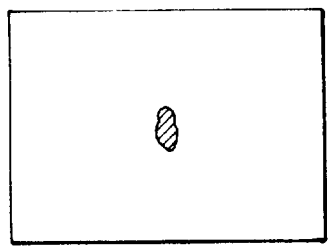
FIGS. 32A, 32B, 32C, 32D and 32E illustrate the operation explained in FIG. 31.
Figure 32B:
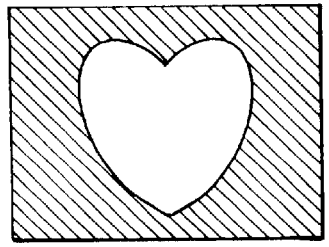
Figure 32C:
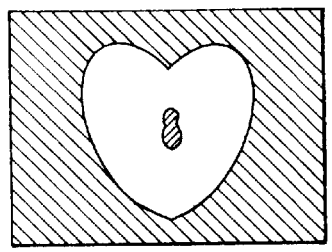
Figure 32D:
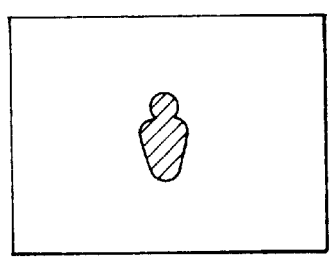
Figure 32E:
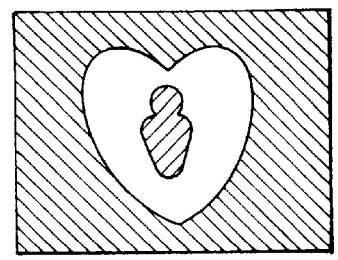
Figure 33:
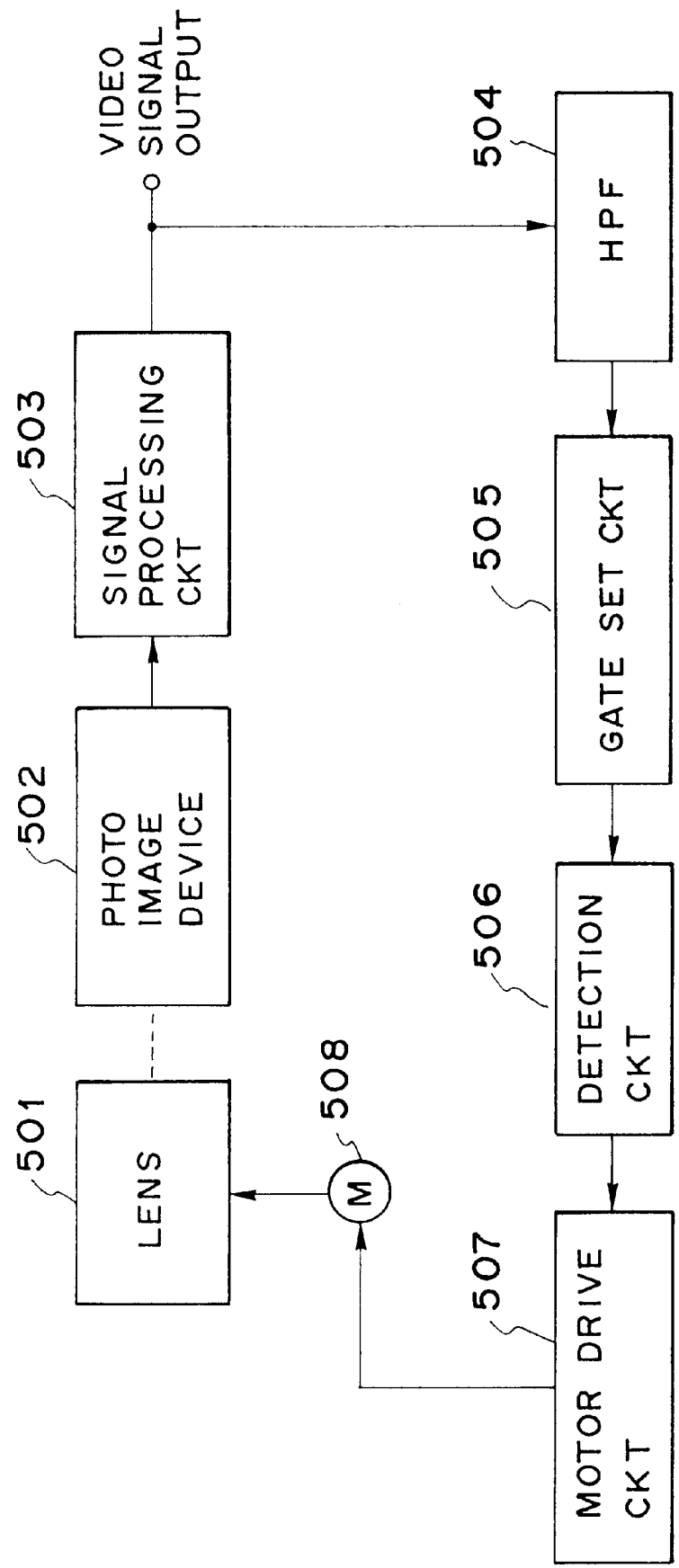
FIG. 33 is a block diagram of a conventional imaging apparatus.

In step 201, the image pick up synthesis control circuit 303 determines both the size of an object area (see FIG. 32A) and the size of a synthesized image (see FIG. 32B). If it is determined in step 202 that either of the sizes is improper, the process goes to step 203 wherein the image pick up synthesis circuit 303 determines which size is changed, whether the size of the synthesized image or the size for the object. If the size of the object is to be changed, the magnification changing instruction of changing the magnification of the photographic optical system 301 toward the wide-angle or telephoto end is output to the photographic optical system drive circuit 312 in step 204. Consequently, a change in the magnification in a designated direction is started, whereby the size of the object on the screen changes in a predetermined size direction. If it is determined in step 206 that the size of the object has reached a predetermined size (see FIG. 32D), the process goes to step 207.

If a predetermined magnification cannot be obtained even when the magnification changing lens in the photographic optical system 301 has reached the wide-angle or telephoto end, the photographer may be alarmed by a display to change the picture taking position. Alternatively, the size of the object may be changed by electronically converting an image signal or by a combination of an electronic means and an optical means.

If it is determined in step 203 that the size of the image stored in the image memory 313 is changed, the process and goes to step 205, and the so-called affine transformation, such as translation, enlargement/reduction or rotation, is conducted on this image to change the size of the synthesized image to a desired size.

It may also be arranged such that a desired size is selected from along plural sizes of the same synthesized image stored in the image memory 313.

If the above-described operation has been complete or if it is determined that both the size of the object and the size of the synthesized area are proper in step 202, the process advances to step 207, and the transformed or unchanged synthesized image is supplied to the image synthesis circuit 305.

If image synthesis continues on plural screens, the process returns from step 208 to step 201 to repeat a series of the above-described operations.

Thus, the image synthesis circuit 305 synthesizes the image signal supplied from the image pick up synthesis control circuit 303 with the same image signal as that used to recognize the object (see FIG. 32E), and supplies the synthesized image to the projected image signal conversion circuit 306.

In the above-described embodiments, image synthesis is conducted on the basis of the object area information picked up by the object picking-up circuit 307. However, it may also be arranged such that, if it is determined that, for example, a sky is present from the luminance or color signal in the image signal, since no object is present in that area, a memory image is synthesized on that area.

Furthermore, the synthesized image is not limited to the still picture. A moving picture, consisting of plural frames, may be subjected to the aforementioned process one frame at one time.

Furthermore, the synthesis process is performed after the area of a synthesized image has been set in each of the above-described embodiments. However, the synthesis process may be performed after the synthesized image data has been compared with the object area.

As will be understood from the foregoing description, the present invention includes the image pick up synthesis control means which controls synthesis of the image obtained by the image pick up device with the image stored in the image storage means on the basis of the image signal from the image pick up device.

Alternatively, the present invention includes the object picking-up means for picking up the area of the object from the image signal from the image pick up device, and the image pick up synthesis control means which controls synthesis of the image obtained by the image pick up device with the image stored in the image storage means on the basis of the object area information picked up by the object picking-up means.

When the image obtained by the image pick up device is synthesized with the stored image, simple synthesis may produce an image in which these images are superimposed. Therefore, synthesis of these images is controlled on the basis of either the image signal from the image pick up device or the object area information picked up by the object picking-up means.

It is therefore possible to synthesize images without requiring a troublesome operation and without degrading the object and the image used for synthesis.

What is claimed is:

1. An apparatus capable of automatically following a target in an object image, said apparatus comprising:

means for displaying an object image;

means for designating a plurality of targets in the object image and displaying respective frames indicating respective contour outlines of the plurality of targets superposed on the object image at positions where the respective targets lie in said displaying means;

means for manually selecting a target to be followed from among the plurality of targets, said manually selecting means including a target selecting switch having an ON state and an OFF state, and visual axis detecting means for detecting a direction of a visual axis of a user, wherein said target is selected in accordance with an output of said visual axis detecting means, and wherein a detection operation of said visual axis detecting means is performed in response to said target selecting switch being switched to the ON state.

2. An apparatus according to claim 1, wherein each of the plurality of targets consists of a sharp-focused portion in the object image displayed in said displaying means.

3. An apparatus according to claim 1, wherein said apparatus performing a target following operation including a target following motion that continuously maintains the target in-focus on a detecting surface of said image displaying means.

4. An image-taking apparatus capable of automatically following a target in an object image, said apparatus comprising:

means for displaying an object image;

means for designating a plurality of targets in the object image and displaying respective patterns indicating each of the plurality of targets superposed on the plurality of targets in the object image in said displaying means; and means for manually selecting a target to be followed from among the plurality of targets, said manually selecting means including a target selecting switch having an ON state and an OFF state, and visual axis detecting means for detecting a direction of a visual axis of a user, wherein said target is selected in accordance with an output of said visual axis detecting means, and wherein a detection operation of said visual axis detecting means is performed in response to said target selecting switch being switched to the ON state.

5. An apparatus according to claim 4, wherein said apparatus performs a following motion that continuously maintains the target in-focus on a detecting surface of said image displaying means.

6. An apparatus according to claim 4, wherein the plurality of targets designate a respective plurality of objects in the object image, and wherein respective distances from said apparatus to said plurality of objects are mutually different.

7. An apparatus according to claim 4, wherein each of the plurality of targets consists of a sharp-focused portion in the object image displayed in said displaying means.

8. An apparatus according to claim 7, wherein each of the plurality of targets includes a frame, respectively surrounding one of the plurality of sharp-focused portions, wherein each of the frames is substantially similar to an outline of a respective portion of the object image displayed in said displaying means, and wherein said displaying means displays the frame respectively surrounding one of the plurality of sharp-focused portions of the object image displayed in said displaying means.

9. An apparatus according to claim 7, wherein said displaying means further displays a cursor for indicating a position of the visual axis.

* * * * *

UNITED STATES PATENT AND TRADEMARK OFFICE
CERTIFICATE OF CORRECTION

PATENT NO. : 6,118,484

DATED : September 12, 2000

INVENTOR(S): HIDEO YOKOTA, ET AL.

It is certified that error appears in the above-identified patent and that said Letters Patent is hereby corrected as shown below:

References Cited   [56]

FOREIGN PATENT DOCUMENTS

"1190177" should read --1-190177--;
"2117276" should read --2-117276--; and
"3154576" should read --3-154576--.

SHEET 24

Figure 26:
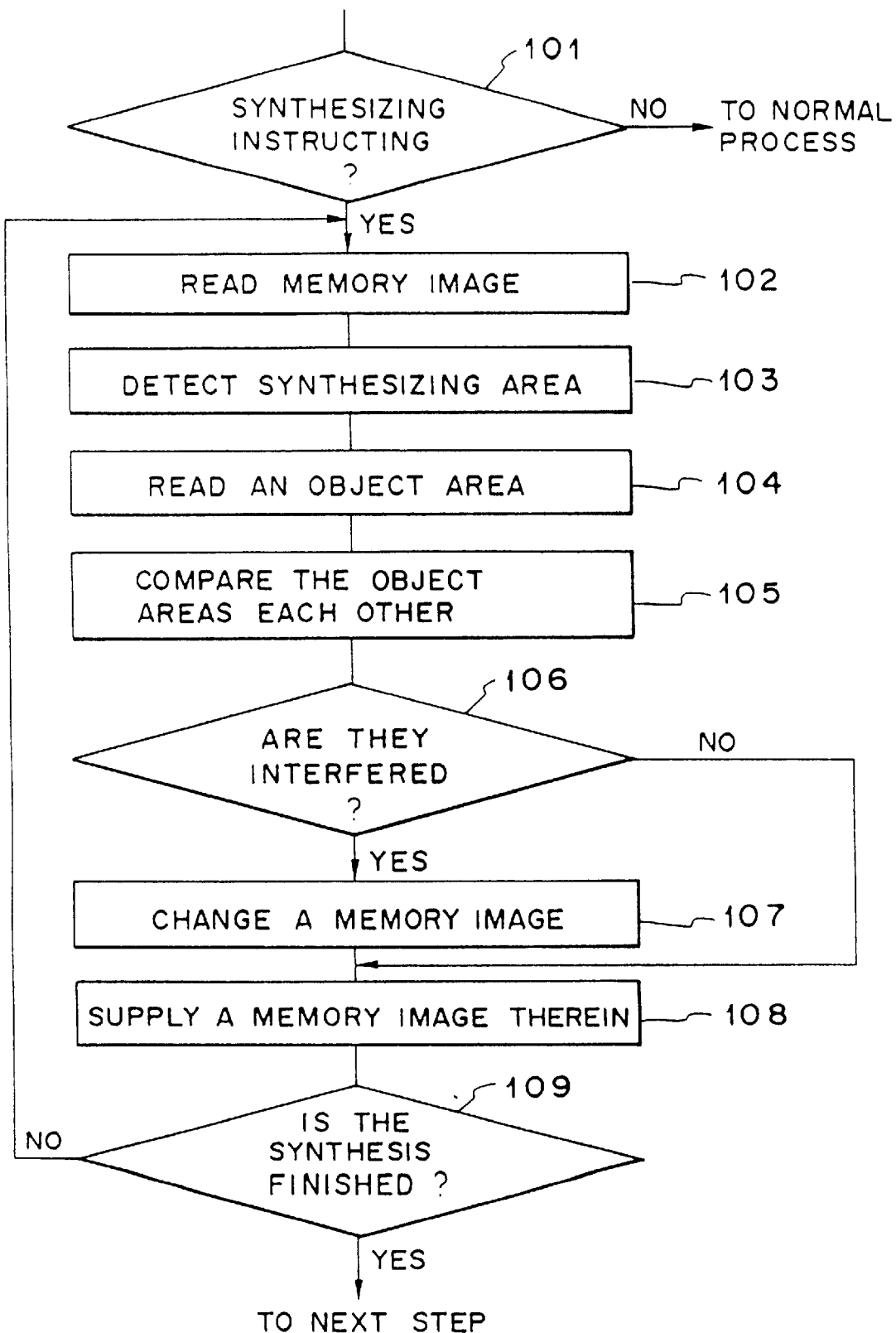
FIG. 26 is a flowchart showing the operation of the portion of the imaging apparatus shown in FIG. 24 which is associated with the present invention.

Fig. 26, "EACH" should read --WITH EACH--.

COLUMN 2

Line 64, "illustrate" should read --illustrates--.

COLUMN 7

Line 58, "generator" should read --generated--.
Line 67, "made" should read --determined--.

UNITED STATES PATENT AND TRADEMARK OFFICE
CERTIFICATE OF CORRECTION

PATENT NO. : 6,118,484

DATED : September 12, 2000

INVENTOR(S): HIDEO YOKOTA, ET AL.

It is certified that error appears in the above-identified patent and that said Letters Patent is hereby corrected as shown below:

COLUMN 10

Line 66, "step 108" should read --step 108,--.
Line 67, "further," should read --further--.

COLUMN 11

Line 6, "area" should read --area.--.
Line 10, "increases the," should read --increases, the--.

COLUMN 12

Line 16, "done the," should read --done, the--.

COLUMN 15

Line 1, "an" should read --a--.

UNITED STATES PATENT AND TRADEMARK OFFICE
CERTIFICATE OF CORRECTION

PATENT NO. : 6,118,484

DATED : September 12, 2000

INVENTOR(S): HIDEO YOKOTA, ET AL.

It is certified that error appears in the above-identified patent and that said Letters Patent is hereby corrected as shown below:

<u>COLUMN 16</u>

Line 27, "of" should read --for--.
    Line 45, "and" should be deleted.

Signed and Sealed this

Twenty-ninth Day of May, 2001

*Attest:*

NICHOLAS P. GODICI

*Attesting Officer*     Acting Director of the United States Patent and Trademark Office